US008245086B2

(12) United States Patent
Eide et al.

(10) Patent No.: US 8,245,086 B2
(45) Date of Patent: Aug. 14, 2012

(54) VISUAL FEEDBACK SYSTEM FOR MULTIPLE PARTITIONS ON A SERVER

(75) Inventors: Curtis S. Eide, Rochester, MN (US); Michael T. Kalmbach, Elgin, MN (US); Aditya Kumar, Rochester, MN (US); Timothy L. Thompson, Rochester, MN (US); Brent R. Tiefenthaler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 12/492,422

(22) Filed: Jun. 26, 2009

(65) Prior Publication Data
US 2010/0332912 A1 Dec. 30, 2010

(51) Int. Cl.
*G06F 11/00* (2006.01)
(52) U.S. Cl. .............................. 714/46; 714/47.1; 714/25
(58) Field of Classification Search ................. 714/6, 46, 714/1, 25, 47.1, 48, 57
See application file for complete search history.

(56) References Cited

U.S. PATENT DOCUMENTS

| 6,108,759 | A * | 8/2000 | Orcutt et al. ................... 711/173 |
| 2002/0124152 | A1 * | 9/2002 | Arndt et al. ....................... 712/1 |
| 2003/0101377 | A1 * | 5/2003 | Dawkins et al. .................. 714/34 |
| 2003/0204648 | A1 * | 10/2003 | Arndt ................................ 710/5 |
| 2003/0212884 | A1 * | 11/2003 | Lee et al. ........................... 713/1 |
| 2007/0220203 | A1 * | 9/2007 | Murase .......................... 711/114 |
| 2008/0222632 | A1 * | 9/2008 | Ueno et al. ......................... 718/1 |
| 2008/0301487 | A1 * | 12/2008 | Hatta et al. ........................ 714/3 |
| 2009/0240986 | A1 * | 9/2009 | Warren et al. ................... 714/32 |
| 2009/0276783 | A1 * | 11/2009 | Johnson et al. ................ 718/104 |

* cited by examiner

*Primary Examiner* — Scott Baderman
*Assistant Examiner* — Sarai Butler
(74) *Attorney, Agent, or Firm* — Patterson & Sheridan LLP

(57) ABSTRACT

Techniques are disclosed for conveying which hardware components of a logically partitioned computer system are assigned to a selected logical partition of the computer system. Partition information for the computer system is received. Further, a request is received from a user to view which hardware components of the computer system are assigned to a selected logical partition of the computer system. Based on the received partition information, one or more hardware components are determined that are assigned to the selected logical partition. Based on the determined hardware components, a virtual model of the computer system is generated that visually distinguishes hardware components assigned to the selected logical partition from hardware components not assigned to the selected logical partition. The virtual model is output responsive to the request.

24 Claims, 21 Drawing Sheets

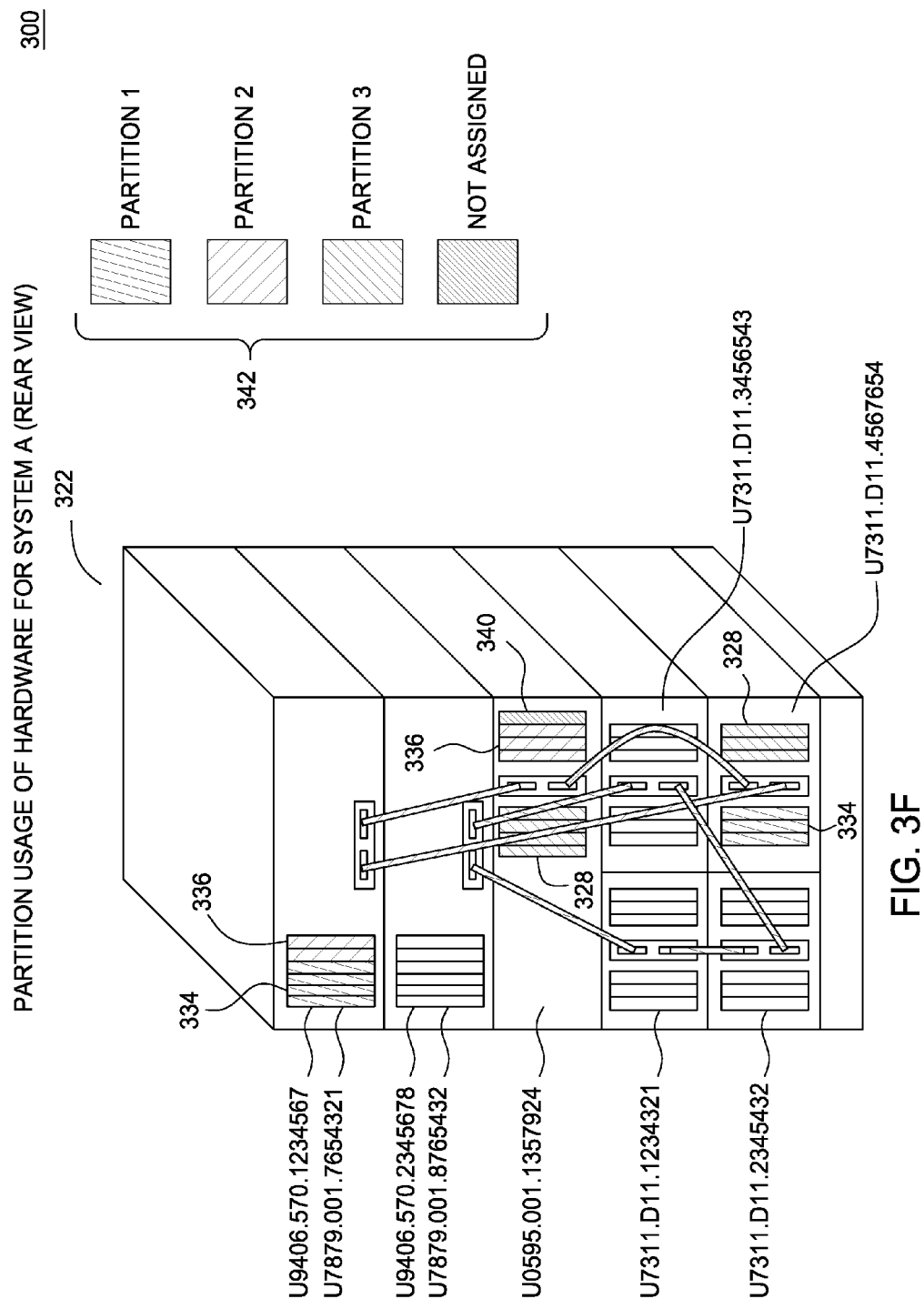

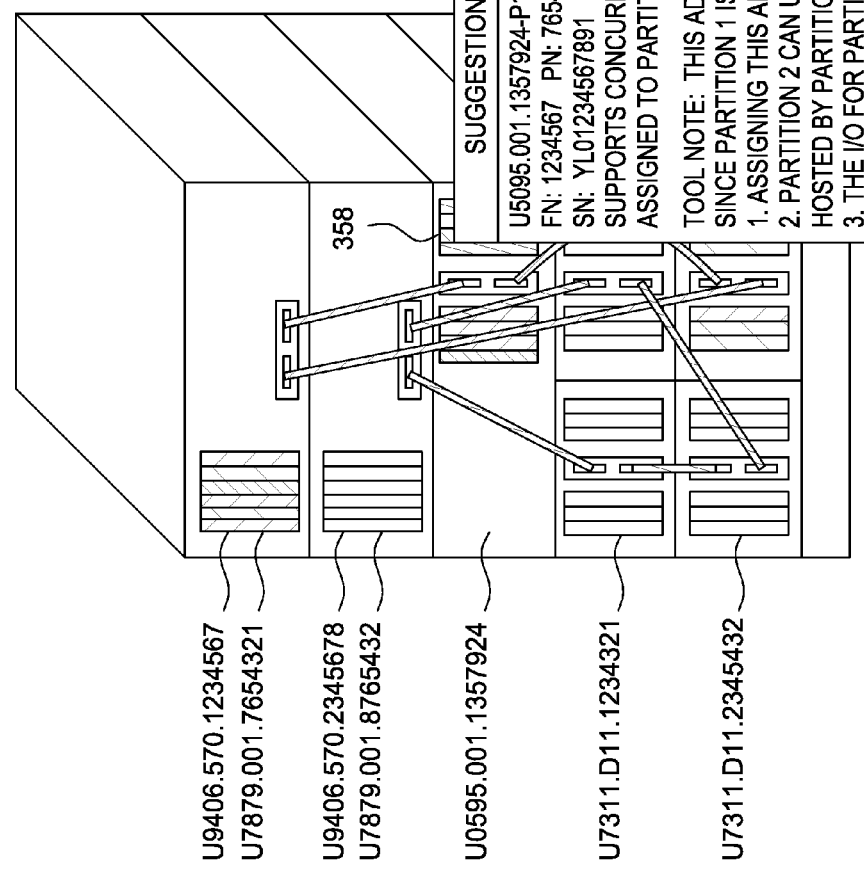

UNDERSTANDING FAILURE SCENARIOS (CONTINUED)

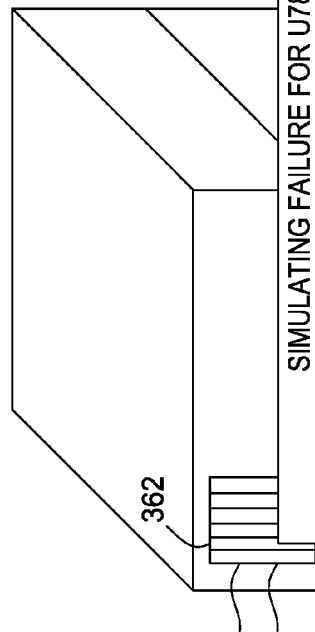

SIMULATING FAILURE FOR U7879.001.7654321-P1-C2

THIS ID THE ONLY ETHERNET ADAPTER CURRENTLY ASSIGNED TO PARTITION 1.
IF THIS CARD WERE TO FAIL, THE FOLLOWING WOULD OCCUR ON THIS SYSTEM
CONFIGURATION:
 o PARTITION 1 WOULD LOSE ALL ETHERNET CONNECTIVITY (CRITICAL OUTAGE)
 o PARTITION 3 WOULD LOSE ACCESS TO VIRTUAL ETHERNET ADAPTER VETH0.
    o NOTE: PARTITION 3 HAS NO OTHER PHYSICAL OR VIRTUAL ETHERNET
       ADAPTERS.   (CRITICAL OUTAGE)

ANALYSIS:
THIS CARD IS A SINGLE POINT OF FAILURE FOR TWO PARTITIONS.
RECOMMENDATIONS:
ASSIGN ANOTHER ETHERNET ADAPTER TO PARTITION 1 AND CREATE A BACKUP
VIRTUAL ETHERNET ADAPTER FOR PARTITION 3.

| PURCHASE NEW ADAPTER | HIGHLIGHT AVAILABLE ADAPTERS | CREATE BACKUP VIRTUAL ETHERNET ADAPTER |

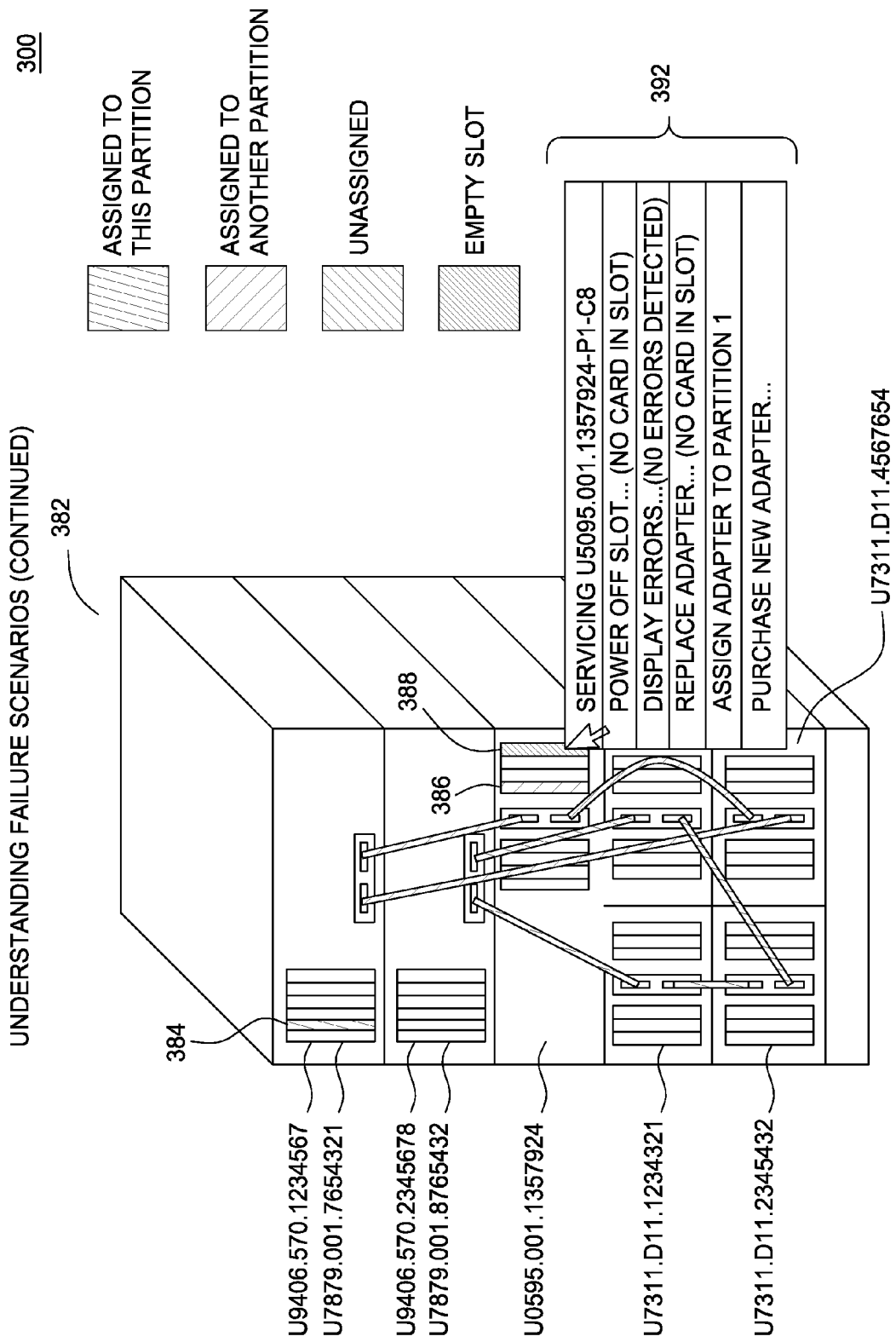

VISUAL FEEDBACK SYSTEM FOR MULTIPLE PARTITIONS ON A SERVER

BACKGROUND OF THE INVENTION

1. Field of the Invention

Embodiments of the invention convey hardware components of a logically partitioned computer system. More specifically, embodiments of the invention convey hardware components that are assigned to a logical partition of a computer system.

2. Description of the Related Art

Platform virtualization provides a virtual environment in which one or more "guest" operating systems may execute concurrently on a single, "host" computer system. The virtual environment may include an isolated execution environment (called a logical partition, or LPAR) for each guest operating system. Each guest operating system may, without modification, execute in its respective logical partition. Further, each logical partition may include a portion of the physical processors, physical memory, and other physical resources of the computer system, as assigned by an administrator. As such, an administrator may specify how physical resources of the computer system are shared between the logical partitions. In other words, each logical partition is a subset of the physical (i.e., hardware) resources of a computer system, virtualized as a separate computer. That is, each logical partition operates largely as if on a separate computer. Platform virtualization may be applied, for example, in problem domains such as server consolidation, software quality assurance (QA), information technology (IT) training, and disaster recovery.

SUMMARY OF THE INVENTION

One embodiment of the invention includes a method for conveying which hardware components of a logically partitioned computer system are assigned to a logical partition of the computer system. The operation may generally include receiving partition information for the computer system, wherein the partition information describes the hardware components assigned to each logical partition of the logically partitioned computer system; receiving, from a user, a request to view which hardware components of the computer system are assigned to a user-selected logical partition of the computer system; determining which hardware components of the computer system are assigned to the selected logical partition, based on the received partition information; generating, based on the determined hardware components, a virtual model of the computer system that visually distinguishes hardware components assigned to the selected logical partition from hardware components not assigned to the selected logical partition; and outputting the virtual model to a graphical display device, responsive to the request.

Another embodiment of the invention includes a computer-readable storage medium containing a program, which when executed by the processor is configured to perform an operation for conveying which hardware components of a logically partitioned computer system are assigned to a logical partition of the computer system. The operation may generally include receiving partition information for the computer system, wherein the partition information describes the hardware components assigned to each logical partition of the logically partitioned computer system; receiving, from a user, a request to view which hardware components of the computer system are assigned to a user-selected logical partition of the computer system; determining which hardware components of the computer system are assigned to the selected partition, based on the received partition information; generating, based on the determined hardware components, a virtual model of the computer system that visually distinguishes hardware components assigned to the selected logical partition from hardware components not assigned to the selected logical partition; and outputting the virtual model to a graphical display device, responsive to the request.

Still another embodiment of the invention includes a system having a processor and a memory containing a program, which when executed by the processor is configured to perform an operation for conveying which hardware components of a logically partitioned computer system are assigned to a logical partition of the computer system. The operation may generally include receiving partition information for the computer system, wherein the partition information describes the hardware components assigned to each logical partition of the logically partitioned computer system; receiving, from a user, a request to view which hardware components of the computer system are assigned to a user-selected logical partition of the computer system; determining which hardware components of the computer system are assigned to the selected logical partition, based on the received partition information; generating, based on the determined hardware components, a virtual model of the computer system that visually distinguishes hardware components assigned to the selected logical partition from hardware components not assigned to the selected logical partition; and outputting the virtual model to a graphical display device, responsive to the request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
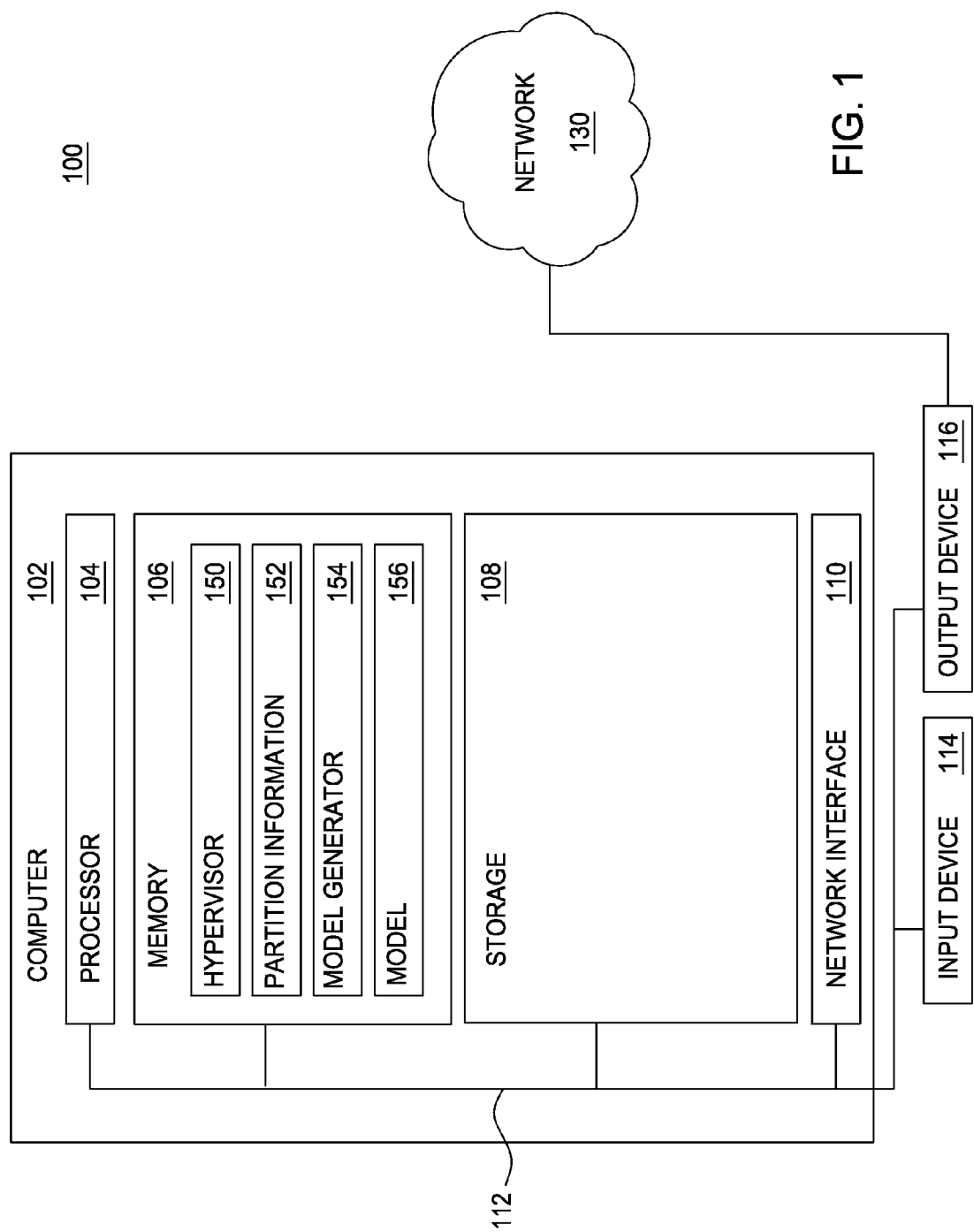
FIG. 1 is a block diagram illustrating a computer system for conveying which hardware components of a logically partitioned computer system are assigned to a selected logical partition of the computer system, according to one embodiment of the invention.

Embodiments of the present invention generally convey which hardware components of a logically partitioned computer system are assigned to a selected logical partition of the computer system. One embodiment of the invention provides a model generator. The model generator may receive partition information for the computer system. Further, the model generator may receive a request from a user to view which hardware components of the computer system are assigned to a selected logical partition of the computer system. Based on the received partition information, the model generator may determine which hardware components are assigned to the selected logical partition. Based on the determined hardware components, the model generator may construct a virtual model of the computer system that visually distinguishes hardware components assigned to the selected logical partition from hardware components not assigned to the selected logical partition. The model generator may output the virtual model to a graphical display device, responsive to the request.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for conveying which hardware components of a logically partitioned computer system are assigned to a selected logical partition of the computer system, according to one embodiment of the invention. As shown, the computer system 100 includes at least one computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130. For example, the network interface device 110 may be a network adapter or other network interface card (NIC).

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a hypervisor 150, partition information 152, a model generator 154, and a virtual model (or simply, model) 156. FIGS. 3 through 9 and associated descriptions detail the structure and operation of the model generator 154 running on the computer 102.

Figure 2:
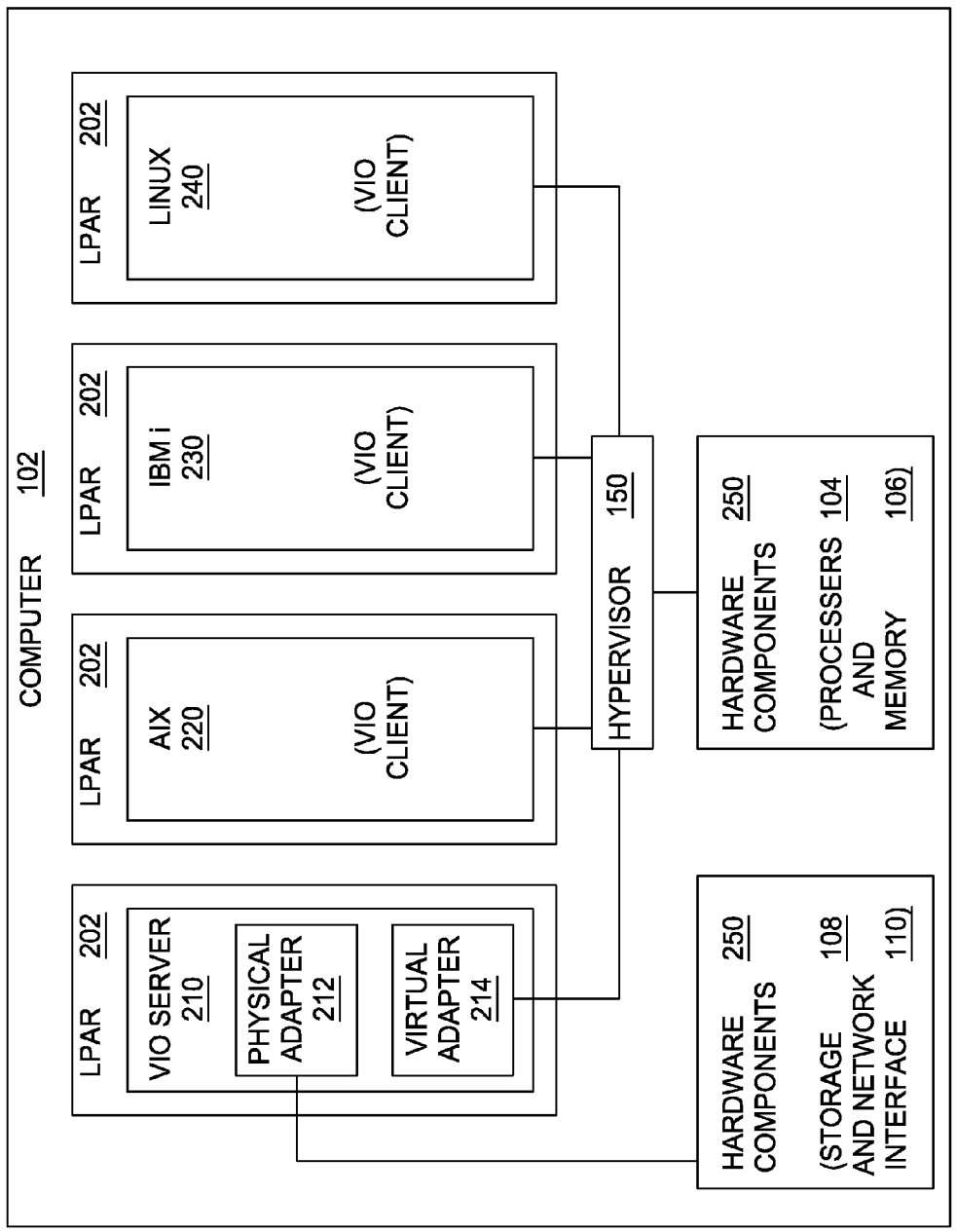
FIG. 2 is a block diagram illustrating a logically partitioned computer system, according to one embodiment.

FIG. 2 is a block diagram illustrating a logically partitioned system 200 (also called a virtualized system) of the computer 102 of FIG. 1, according to one embodiment. As shown, the logically partitioned system 200 includes logical partitions 202 (LPARs) of the computer 102, a hypervisor 150, and hardware components 250. Each logical partition may include a portion of the hardware components 250 of the computer 102. The hardware components 250 may include one or more processors 104, memory 106, one or more storage devices 108, and/or one or more network interfaces 110. Other hardware components 250, such as consoles, are broadly contemplated and may be supported by embodiments of the invention.

In one embodiment, an administrator may assign processors 104, memory 106, and other physical resources of the computer 102 to the logical partitions 202. As such, the administrator may specify how physical resources of the computer 102 are shared between the logical partitions 202. For example, on an IBM® System p® series system, the administrator may use an interface such as the IBM Hardware Management Console (HMC) to configure and operate logical partitions of the system. The HMC is a set of firmware tools for managing resources of a computer 102. For example, the HMC may generate an initial configuration definition, control boot and termination of each logical partition 202, and provide virtual console support. Further, the HMC may store configuration information (also called partition information) 152 in the storage 108. The partition information 152 may also include information stored by the hypervisor 150, according to one embodiment. In one embodiment, the model generator 154 may be integrated into an interface for managing logical partitions (such as the HMC). In another embodiment, the model generator 154 may be a standalone application that works in conjunction with an interface for managing logical partitions (such as the HMC).

The partitioned system 200 may include one or more processors (also called physical processors) 104, according to one embodiment. The one or more physical processors 104 may execute platform virtualization code configured to provide virtual components to respective guest operating systems 210, 220, 230, 240 executing in each logical partition 202. Examples of virtual components include virtual processors, virtual memory, virtual network interfaces, virtual storage devices (such as virtual Small Computer System Interface (SCSI)), and virtual consoles.

As shown, each logical partition 202 hosts a guest operating system 210, 220, 230, 240. The guest operating systems include an IBM® Virtual Input/Output (VIO) Server 210, an IBM® Advanced Interactive Executive (AIX®) operating system 220, an IBM® i operating system 230, and a Linux® operating system 240, according to one embodiment. Such guest operating systems are merely illustrative and are not intended to be limiting of the invention.

As shown, the hypervisor 150 (also called a partition manager or a virtual machine monitor (VMM)) controls and arbitrates access to underlying hardware components 250 to provide an isolated execution environment for each logical partition 202, according to one embodiment. For example, the hypervisor may intercept requests (from the guest operating systems 220, 230, 240) for hardware resources to share and allocate access to the hardware resources among the guest operating systems 220, 230, 240. For instance, if physical processors 104 are shared among the logical partitions 202, the hypervisor 150 may allocate the physical processors 104 between the virtual processors assigned to logical partitions 202. In other words, the hypervisor 150 validates requests from each guest operating system 220, 230, 240 to use shared resources (i.e., underlying hardware components 250) of the system 102, thus ensuring integrity and isolation of the logical partitions 202.

In one embodiment, to reduce complexity of the hypervisor 150, the virtualization of certain types of hardware components 250 may be delegated (by design) to the VIO Server 210. For example, the hypervisor 150 may provide virtualized interfaces one or more specific types of hardware components (e.g., processors 104 and memory 106), while the VIO Server 210 may provide virtualized interfaces to one or more other types of hardware components (e.g., storage 108, network interface 110, consoles, etc.). That is, the VIO Server 210 may provide virtual I/O (e.g., network, storage, and console) services to one or more logical partitions 220, 230, 240 (such logical partitions may also be referred to as VIO Clients). For example, the VIO Server 210 may execute in a logical partition 202 specifically created by the administrator for providing Virtual SCSI and shared Ethernet adapter virtual I/O capabilities to other logical partitions 202 (VIO clients) of the computer 102.

As shown, the VIO Server 210 includes one or more physical adapters 212 and one or more virtual adapters 214, according to one embodiment. Each physical adapter 212 may be a hardware interface (e.g., a Peripheral Component Interconnect (PCI) card) for a respective hardware component (e.g., a storage device 210). Although shown separately from the hardware components 250, the physical adapter 212 and the hardware components 250 may be combined for certain types of hardware components 250 (e.g., a network interface adapter 110), according to one embodiment.

In one embodiment, virtual adapters 214 provide capabilities similar to those of physical adapters 212, but may be implemented in software and need not require dedicated hardware expansion slots (e.g., PCI slots). As such, virtualization of physical adapters 212 allows even a system 200 with only one network adapter 212 and one storage adapter 212 to support many logical partitions 202. The VIO Server 210 controls and arbitrates access (i.e., by a logical partition or VIO Client 220, 230, 240) to each physical component 250 through a virtualized interface (i.e., a virtual adapter 214) to the respective physical adapter 212, according to one embodiment.

Figure 3A:
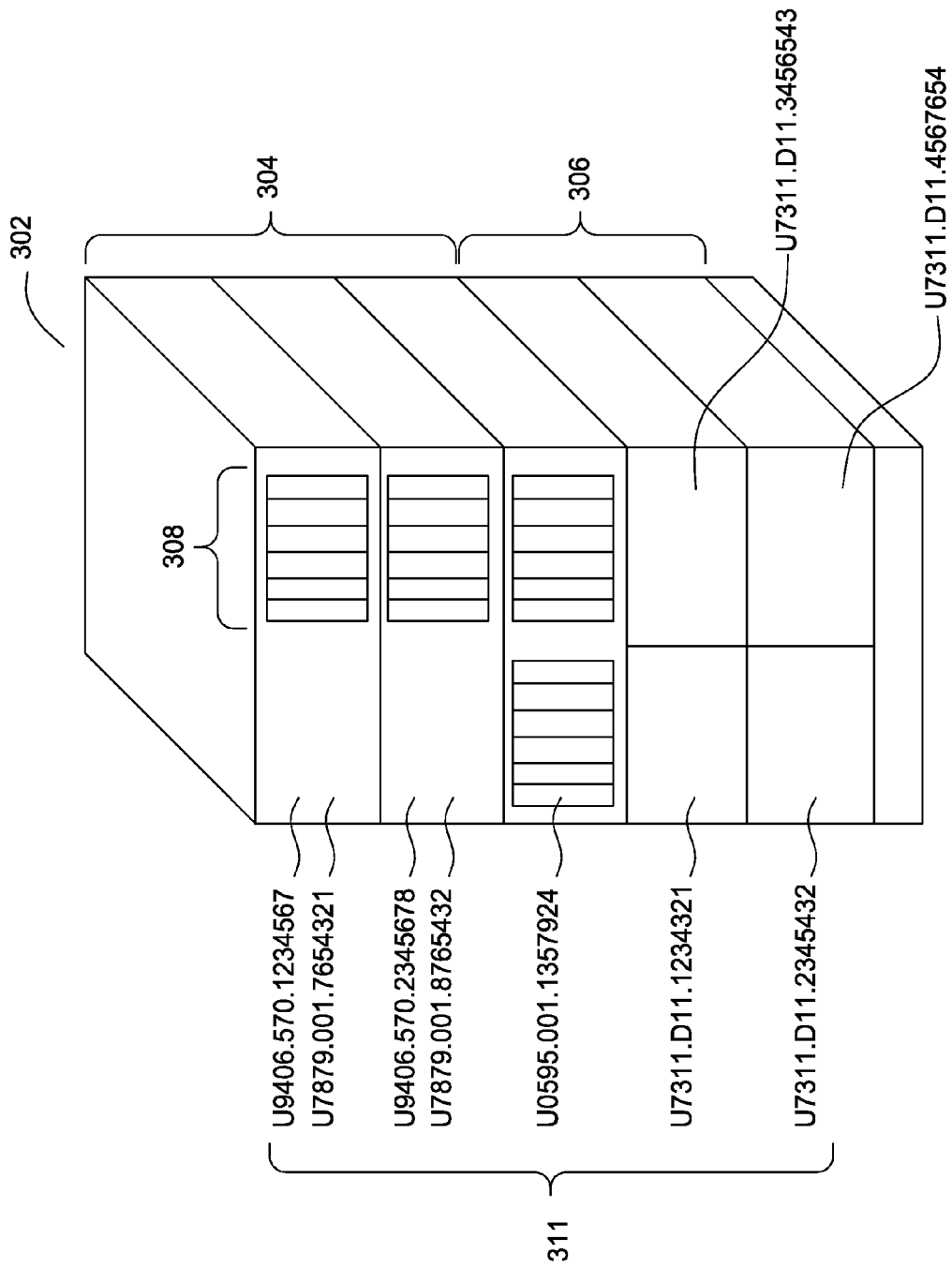
FIGS. 3A-3P illustrate graphical user interface (GUI) screens of a model generator, according to one embodiment of the invention.

FIGS. 3A-3P illustrate graphical user interface (GUI) screens 300 of the model generator 154 of FIG. 1, according to one embodiment of the invention. As shown in FIG. 3A, the GUI screen 300 includes a virtual model 302 (or simply, model) of the system 200. In one embodiment, the model 302 may be a three-dimensional graphical representation of the system 200. As shown, the model 302 represents one or more enclosures (or chassis) 304. For example, for an IBM® System p® series system, the enclosures 304 may include one or more rack-mounted Central Electronics Complex (CEC) drawers. A CEC drawer may include processors 104 and memory 106. Further, A CEC drawer may also include network interfaces 110, storage devices 108, power supplies, cooling fans, etc. That is, the system 200 may include one or more computers 102 or nodes (CECs in this case), according to one embodiment.

As shown, the model 302 also represents one or more enclosures 306, according to one embodiment. For example, for an IBM® System p® series system, the enclosures 306 may represent one or more rack-mounted expansion I/O drawers. In one embodiment, the expansion I/O drawers allow a CEC to access a greater number of storage devices 108 and I/O adapter slots (e.g., PCI-Extended (PCI-X) slots) than are available in the CEC drawer. Each expansion I/O drawer may communicate with the CEC using a communications link. Examples of communications links include Remote I/O (RIO), Remote I/O-2 (RIO-2), and InfiniBand (IB).

As shown, the model 302 also represents six processors 308 of a first enclosure 304, according to one embodiment. Similarly, the model 302 represents six processors of a second enclosure 304 and twelve processors of a third enclosure 304. Further, the model 302 may include one or more location codes 311 for each enclosure 304, 306. In one embodiment, a location code 311 for a specific enclosure includes information sufficient to determine how to represent, in the model 302, a physical appearance of the enclosure of the system 200 (e.g., the type of enclosure, etc.).

Figure 3B:
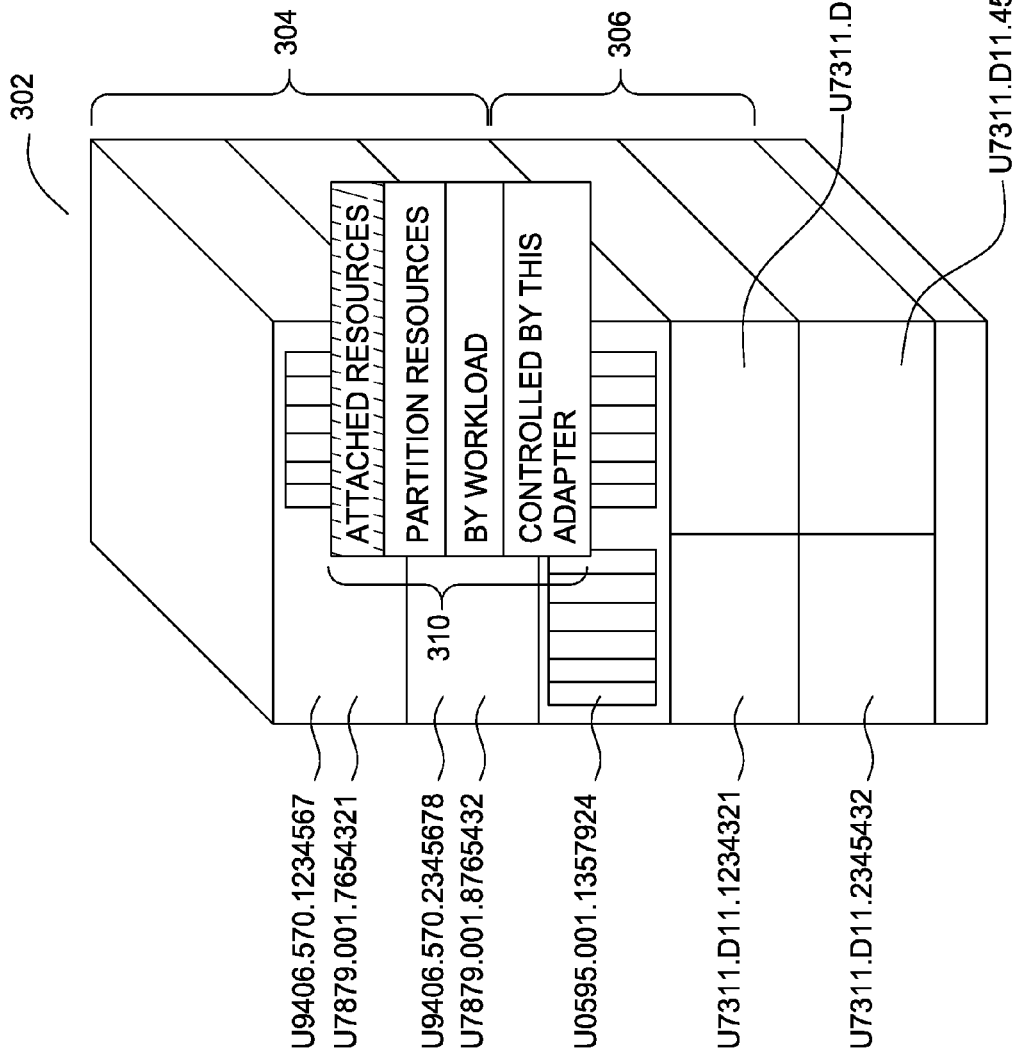
Figure 3C:
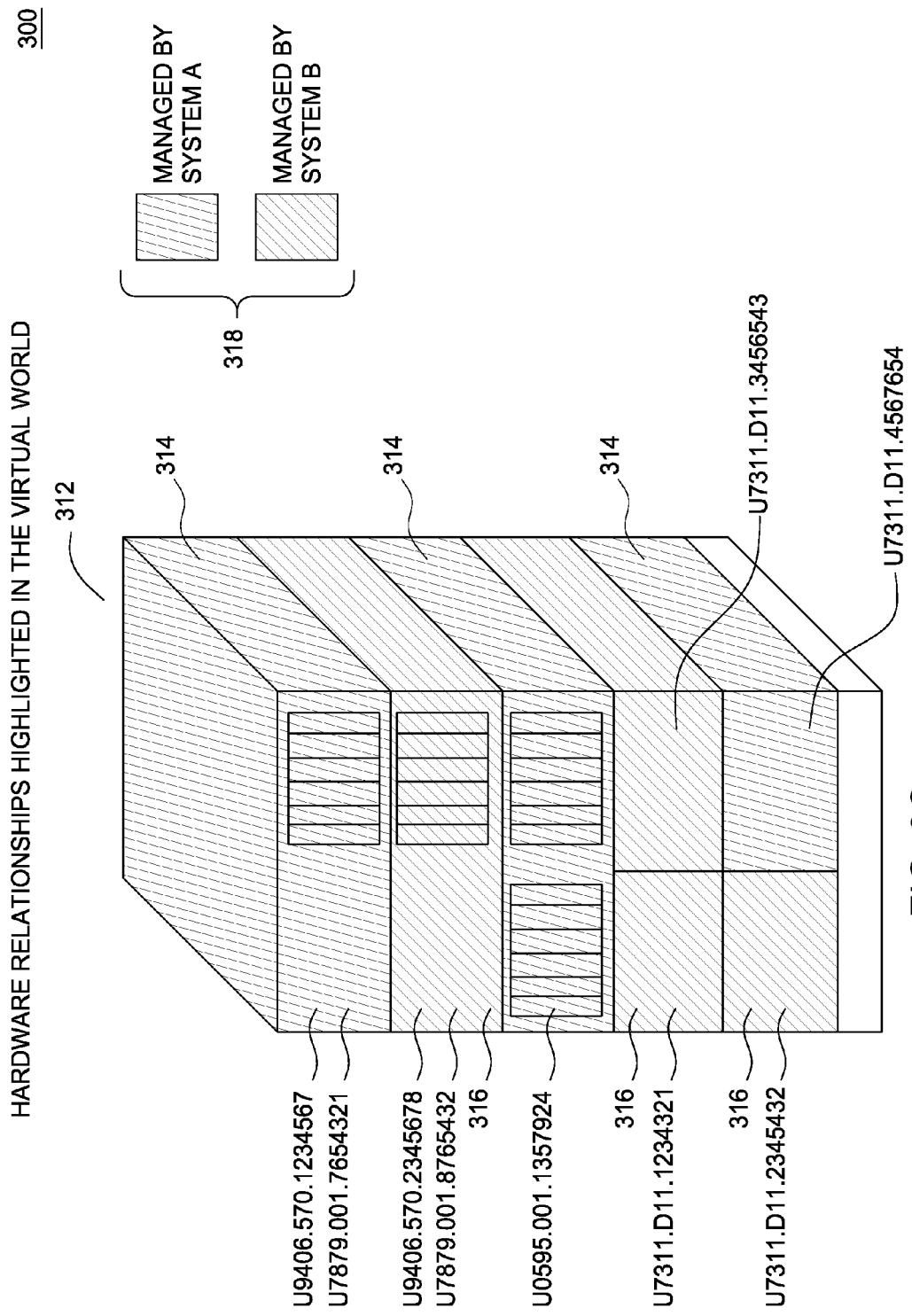

In one embodiment, the model generator 154 conveys information about logical partitions 202 of a system 200 in an intuitive format via the three-dimensional graphical representation (i.e., a model 156) of the system 200. In one embodiment, a user may wish to view how enclosures 304, 306 of the system 200 are physically connected. Referring to FIG. 3B, a user may use a pointing device (such as a mouse) to specify a desired enclosure. In response to the user's selection, the model generator 154 may present options 310 relating to enclosures to the user. In one embodiment, if the user selects (from the presented options 310) to view attached (physical) resources of the selected enclosure, the model generator 154 may generate a new model 156 (of the system 200) that visually distinguishes enclosures 304, 306 physically connected to the selected enclosure from enclosures 304, 306 not physically connected to the selected enclosure. For example, the model 312 of FIG. 3C may be generated. The model 312 conveys to the user that enclosures 314 are physically connected to the selected enclosure (i.e., "System A" in this example), while enclosures 316 are not physically connected to the selected enclosure. The model 312 may also include a legend 318 to convey how enclosures of different systems are represented in the model 312, according to one embodiment.

Figure 3D:
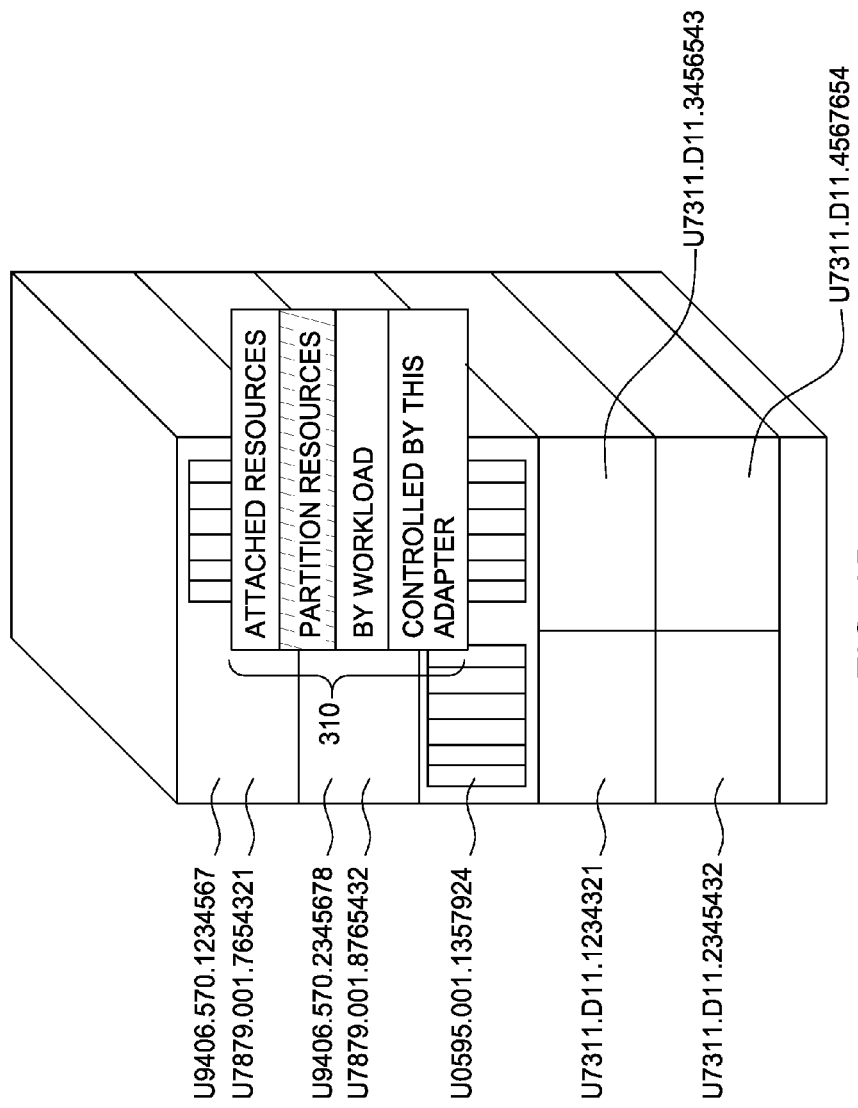
Figure 3E:
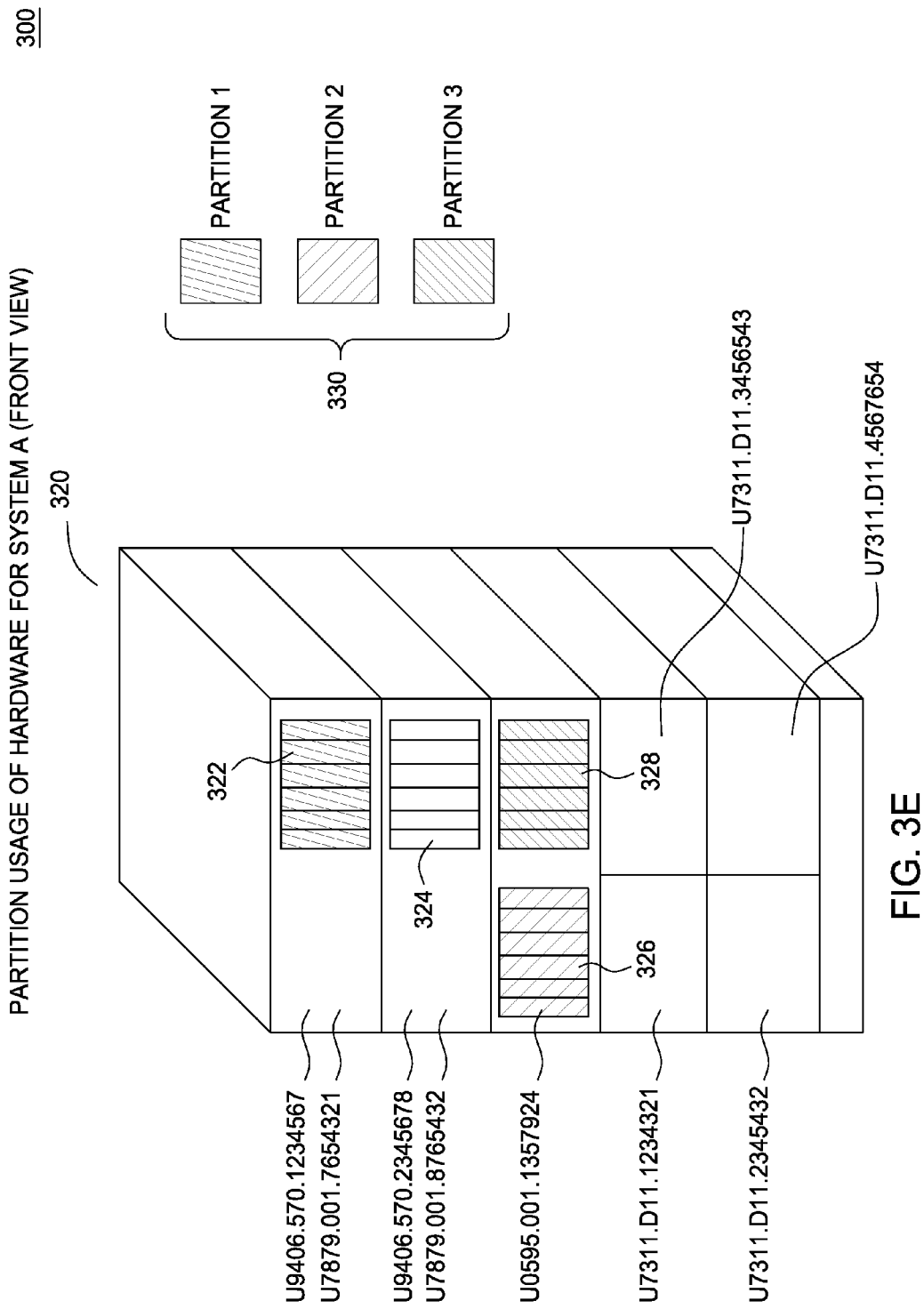

In one embodiment, a user may wish to view how hardware components 250 of the system 200 are allocated across multiple logical partitions 202. Referring now to FIG. 3D, the model generator 154 may present options 310 to the user. In one embodiment, if the user selects to view (logical) partition resources, the model generator 154 may generate a new model 156 (of the system 200) that visually distinguishes hardware components 250 that are assigned to different logical partitions 202. For example, FIG. 3E illustrates a model 330 of the system 200, according to one embodiment. The model 330 conveys to the user that physical processors 322 are assigned to a first logical partition 202. Further, the model 330 conveys that physical processors 326 are assigned to a second logical partition 202; physical processors 328 are assigned to a third logical partition 203. Further still, the model 330 conveys that physical processors 324 are not currently assigned to any logical partition 202. The model 320 may also include a legend 330 to convey how physical components 250 of different logical partitions 202 are represented in the model 320, according to one embodiment.

Another example is shown in FIG. 3F, which illustrates a model 332 showing a rear view of the model 330 of FIG. 3E. Each model 330, 332 is a model of the system 200 of FIG. 2, according to one embodiment. The model 332 conveys to the user that physical network adapters 334 are assigned to a first logical partition 202. Further, the model 332 conveys that physical network adapters 336 are assigned to a second logical partition 202. The model 332 also conveys that physical network adapters 338 are assigned to a third logical partition 203. In addition, the model 332 conveys that physical network adapters 340 are not currently assigned to any logical partition 202. Again, the model 330 may also include a legend 342 to convey how physical components 250 of different logical partitions 202 are represented in the model 332, according to one embodiment.

Figure 3G:
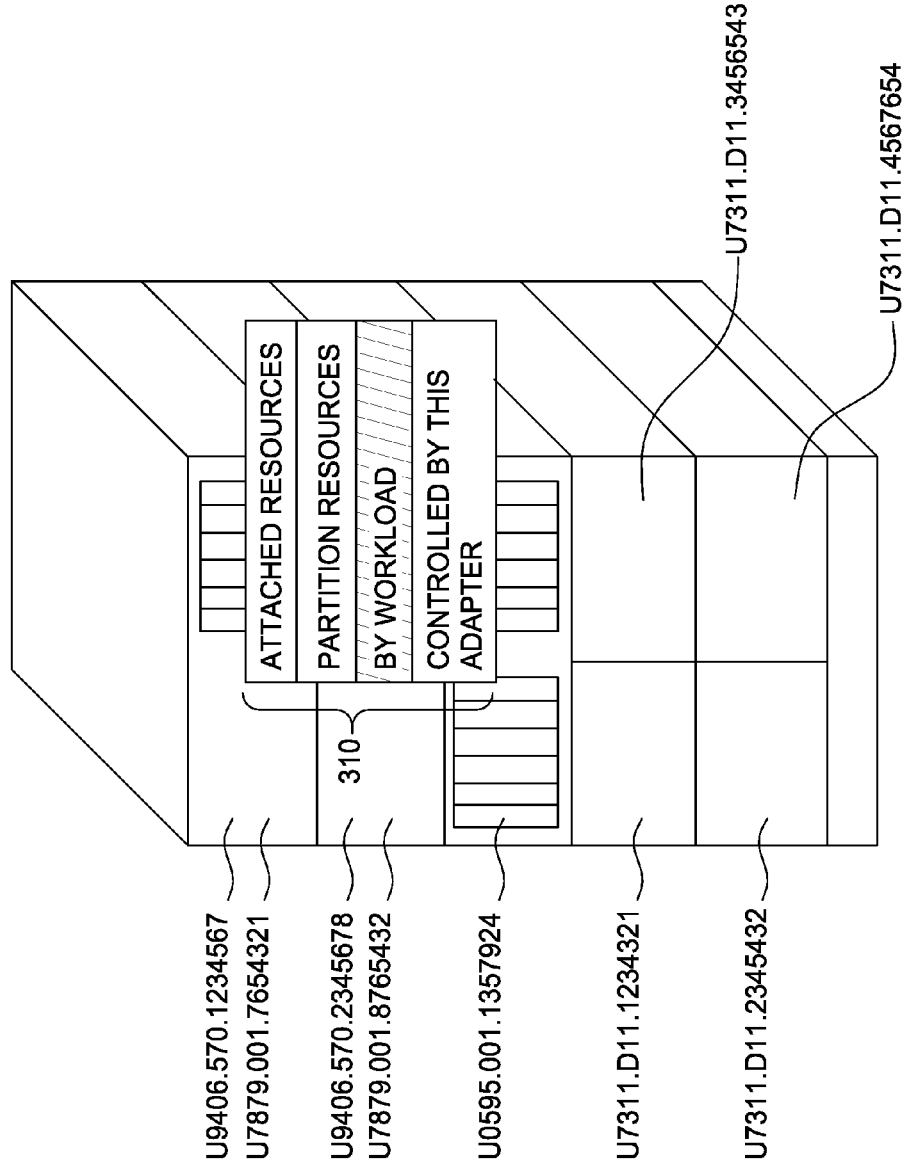
Figure 3H:
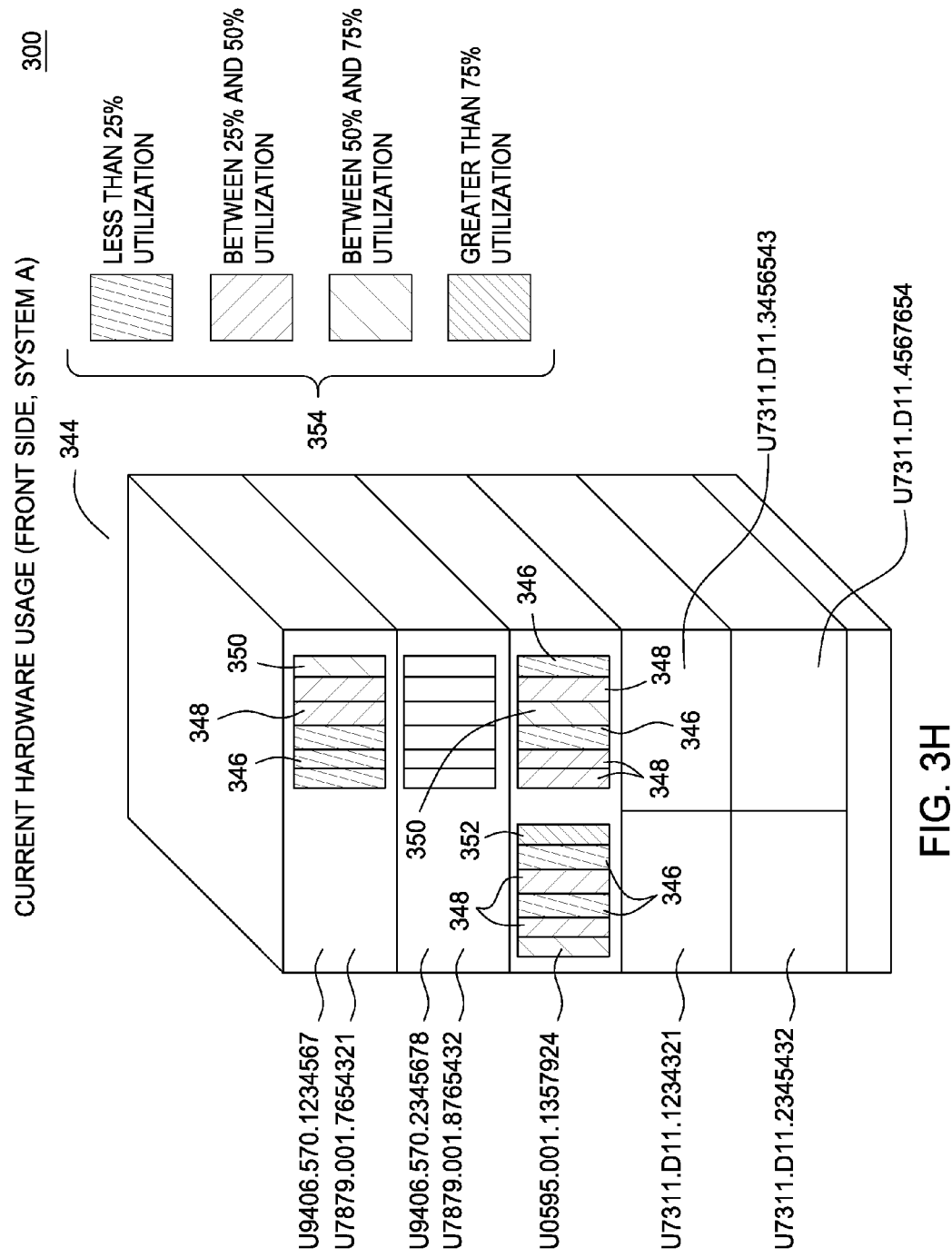

In one embodiment, a user may wish to view the (e.g., current, recent, etc.) utilization levels (also called workload) of the physical adapters 212 of the system 200. Referring now to FIG. 3G (which shows a model of the system 200), the model generator 154 may present options 310 to the user. In one embodiment, if the user selects to view physical adapters 212 by workload, the model generator 154 may generate a new model 156 (of the system 200) that visually distinguishes physical adapters 212 having different utilization levels. In one embodiment, the new model 156 may be generated based on performance data (e.g., statistical data received from a performance analysis application, etc.). Referring to FIG. 3H as an example, the model 344 conveys to the user that physical processors 346 are experiencing less than twenty-five percent utilization; physical processors 348 are experiencing between twenty-five and fifty percent utilization; physical processors 350 are experiencing between fifty and seventy-five percent utilization; and physical processor 352 is experiencing greater than seventy-five percent utilization. The model 330 may also include a legend 354 to convey how physical components 250 of different utilization levels are represented in the model 344, according to one embodiment.

Figure 3I:
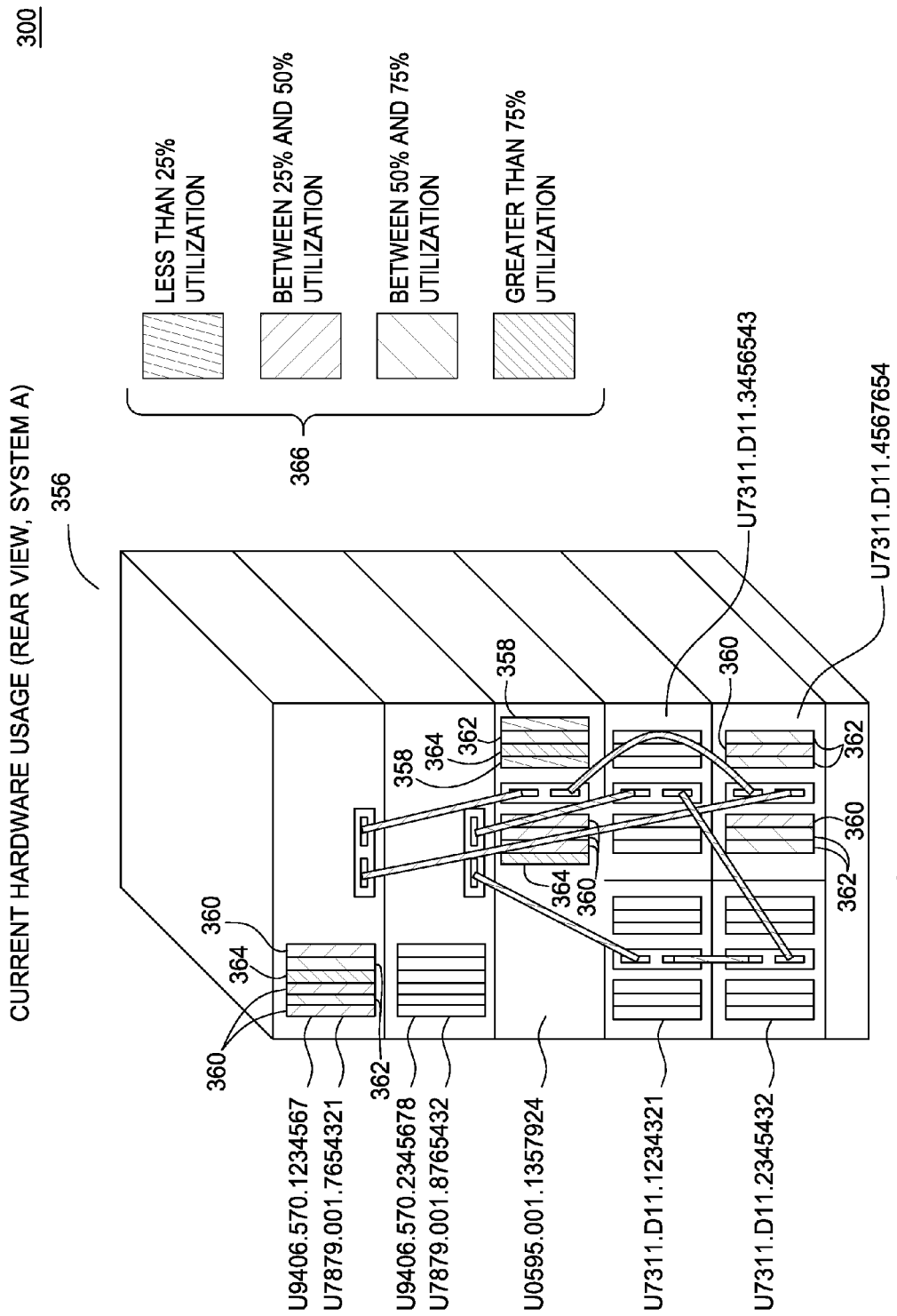

Another example is shown in FIG. 3I, which illustrates a model 356 showing a rear view of the model 344 of FIG. 3H. The model 356 conveys to the user that physical network adapters 358 are experiencing less than twenty-five percent utilization. Further, the model 356 conveys that physical network adapters 360 are experiencing between twenty-five and fifty percent utilization. Further still, the model 356 conveys that physical network adapters 362 are experiencing between fifty and seventy-five percent utilization. Still further, the model 356 conveys that physical network adapters 364 are experiencing greater than seventy-five percent utilization. Once again, the model 356 may also include a legend 366 to convey how physical components 250 of different utilization levels are represented in the model 356, according to one embodiment.

Figure 3J:
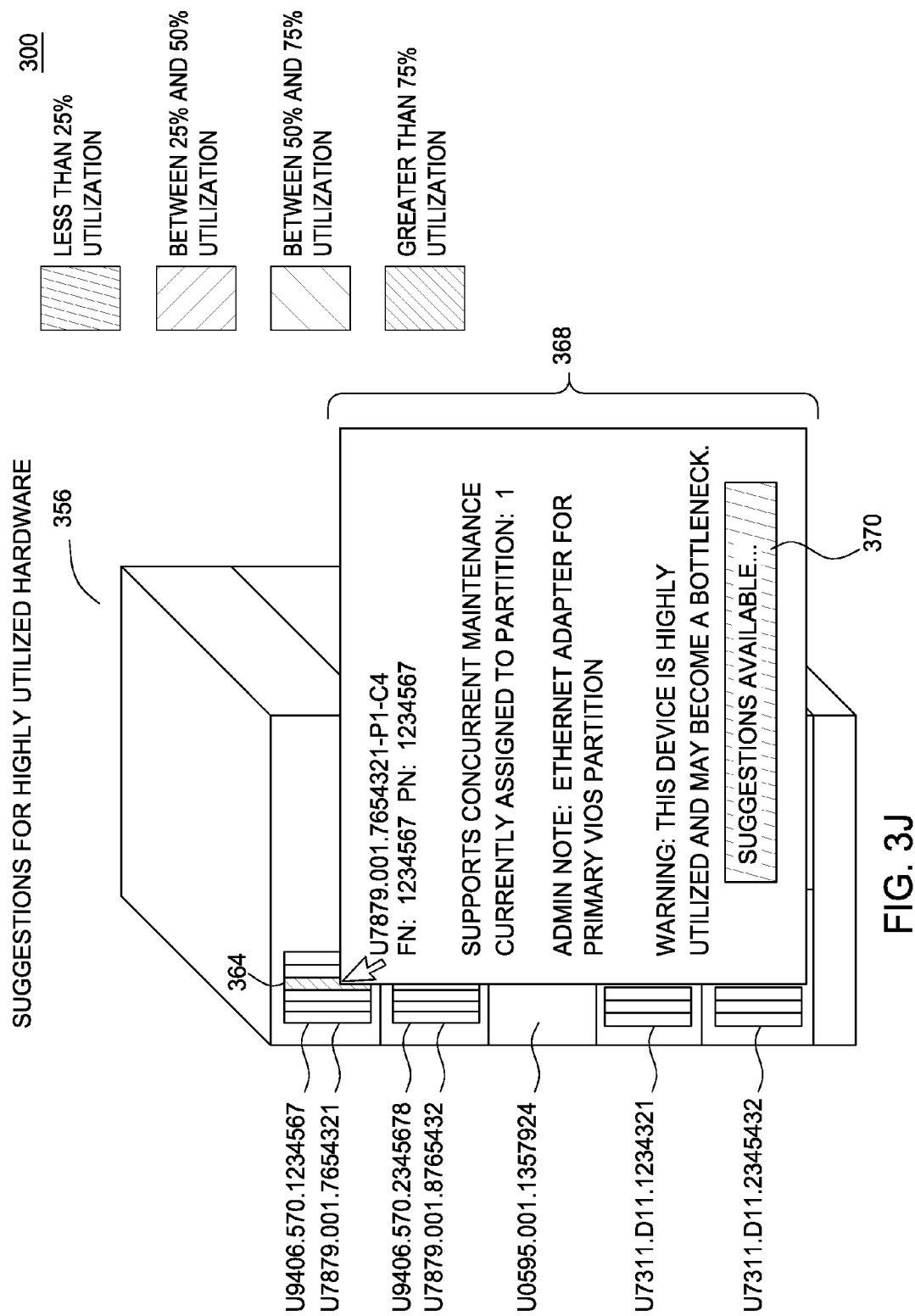
Figure 3L:
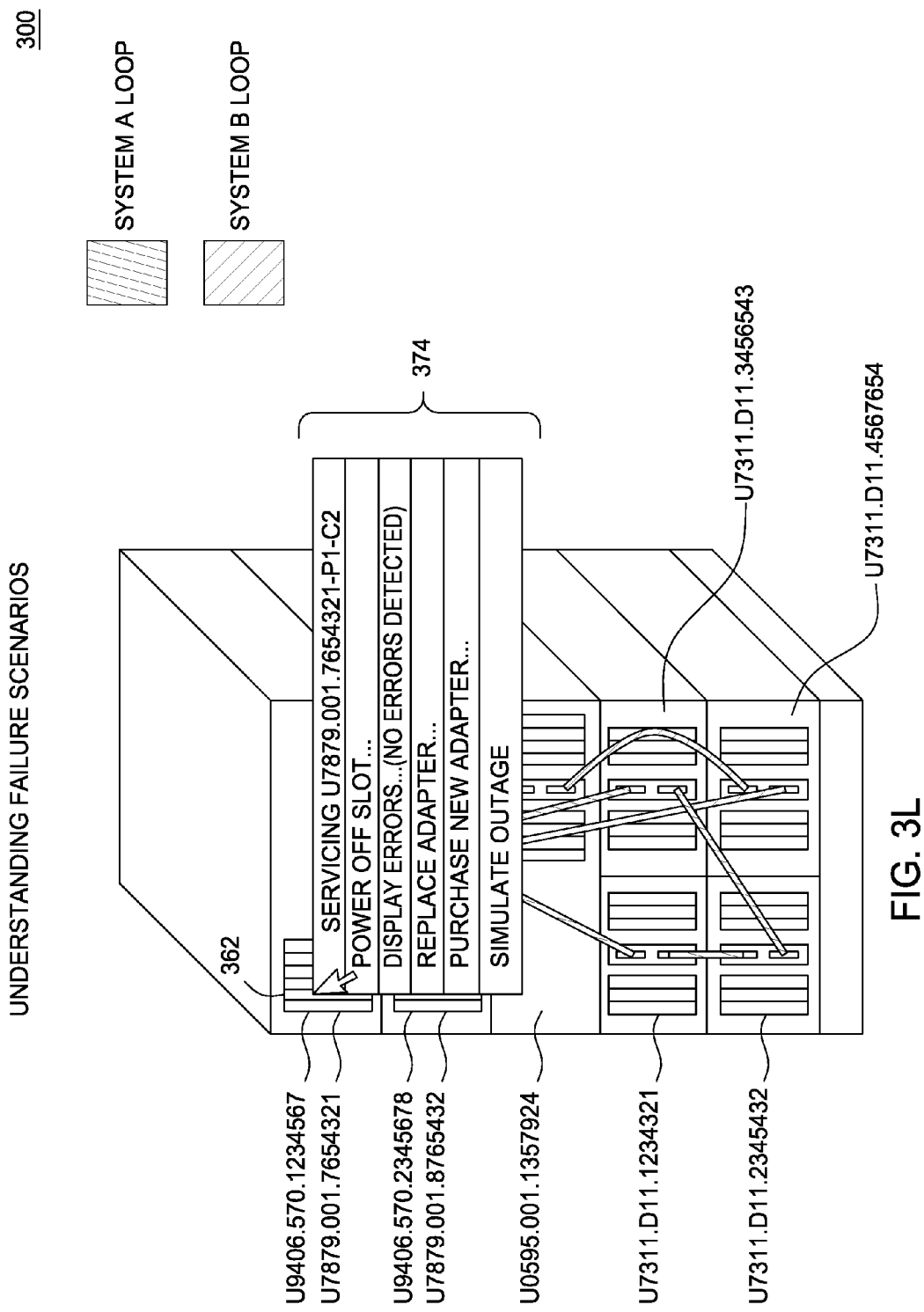

In one embodiment, a user may wish to view suggestions (or recommendations) for distributing workload of a selected hardware component 250 (e.g., of a logical partition 202) to other hardware components 250 of the system 200. For example, FIG. 3J illustrates a model 356 of the system 200. Referring to FIG. 3J, a user may click on a "Suggestions available . . . " button 370 of an information window 368 for a selected, highly-utilized (e.g., greater than seventy-five percent utilization) physical network interface 364 that is assigned to the logical partition 202 for the VIO Server 210. In one embodiment, the model generator 154 may determine another (underutilized, e.g., less than twenty-five percent utilization) physical adapter to assign to the logical partition 202. The model generator 154 may make this determination based on, e.g., partition information 152 and utilization information of the system 200. For example, referring now to FIG. 3K (which illustrates a model 356 showing a rear view of the system 200), the model generator 154 may present a suggestion 372 to the user. The suggestion may include a suggestion to assign the determined, underutilized physical adapter to the logical partition 202 for the VIO Server 210. The workload of the selected hardware component 250 may then be distributed to the determined, underutilized physical adapter to improve overall workload distribution of the system 200.

Figure 3M:
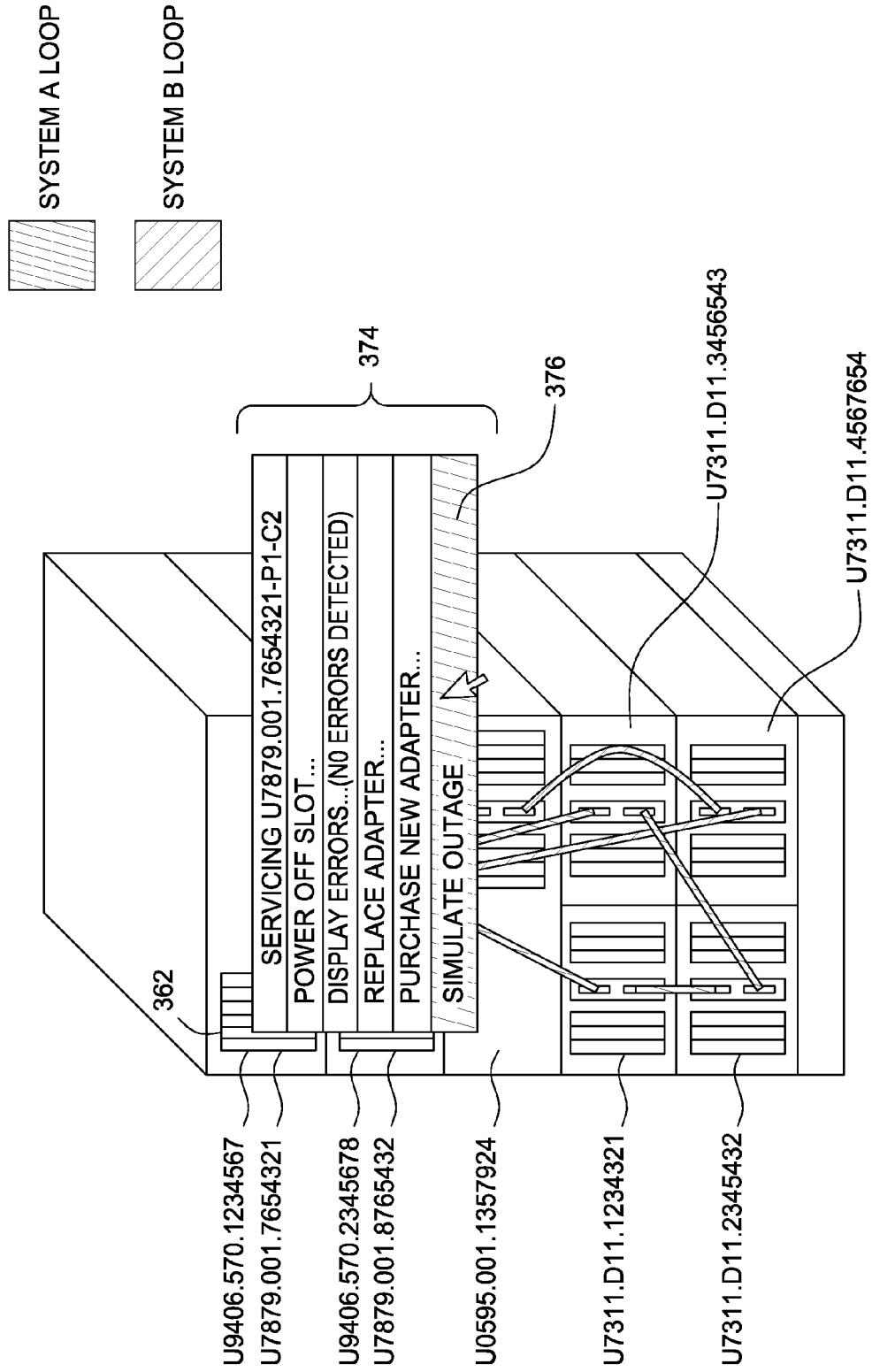

In one embodiment, a user may wish to simulate outage of a selected hardware component 250. That is, a user may wish to view what impact that failure of the selected hardware component 250 may have on the system 200 (e.g., which logical partitions 202 may be adversely affected, etc.). For example, referring now to FIG. 3L, the model generator 154 may present options 374 to a user for a selected hardware component 362. Referring now to FIG. 3M (which shows a model of the system 200), if the user selects the option 376 to simulate an outage of the selected hardware component 362, the model generator 154 may determine (e.g., based on the partition information 152) one or more logical partitions 202 affected (and/or critically affected) by outage of the selected hardware component 362. For example, a logical partition 202 may be said to be "affected" by outage of a physical network adapter 212 if the outage causes the logical partition 202 to lose some (but not all) network connectivity. Further, a logical partition 202 may be said to be "critically affected" by outage of a physical network adapter 212 if the outage causes the logical partition 202 to lose all network connectivity. For instance, referring now to FIG. 3N (which shows a model of the system 200), the model generator 154 may present an outage report 378 to the user, according to one embodiment. The outage report 378 may include a first list of logical partitions 202 affected by outage of the selected hardware component 362 and/or a second list of logical partitions 202 critically affected by outage of the selected hardware component 362.

Figure 3O:
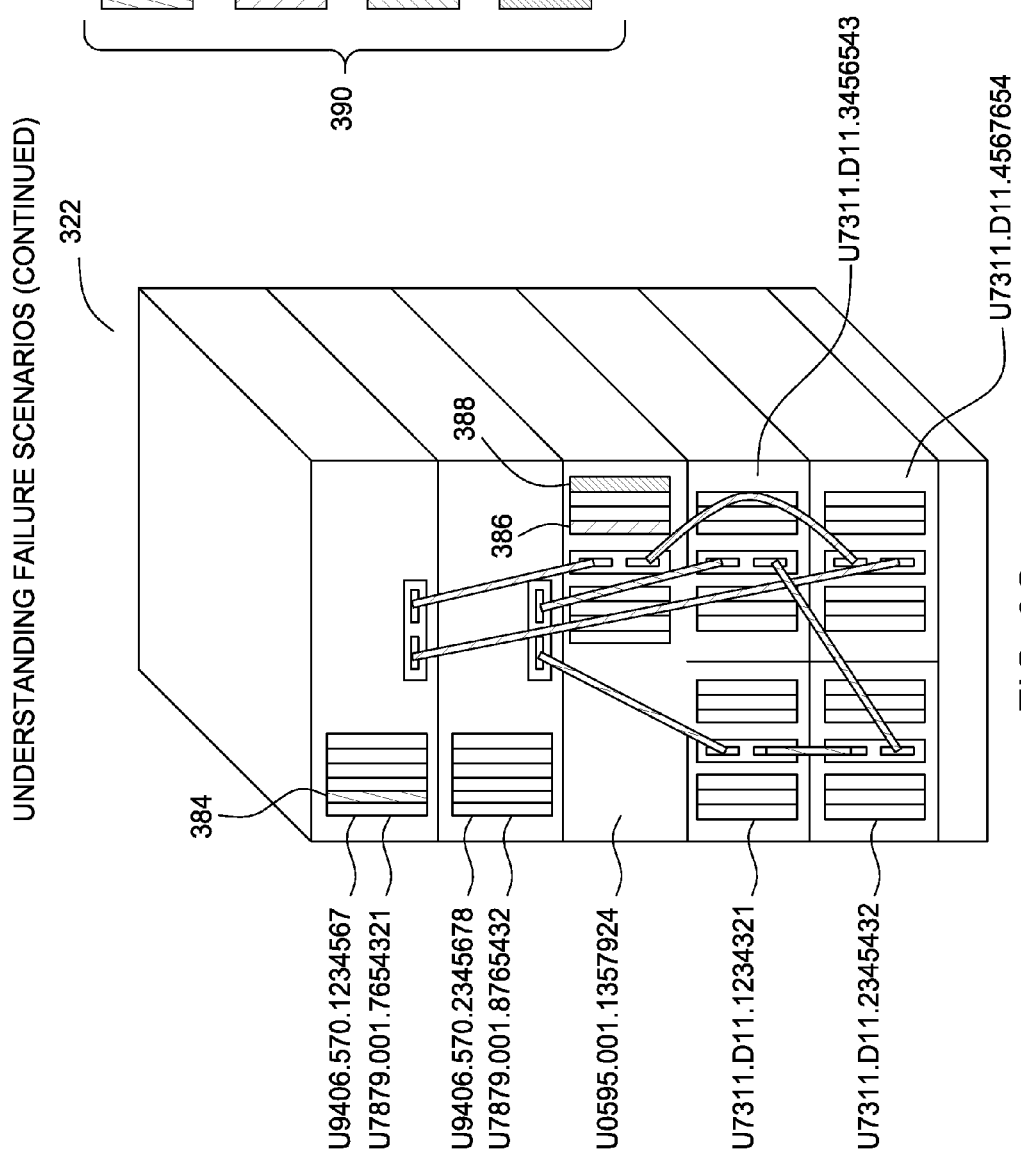

The model generator 154 may also present options 380 associated with an outage report 378 for the logical partition 202, according to one embodiment. For example, a user may select to purchase a new physical network adapter 212, view (e.g., highlight) available physical network adapters 212, create a backup virtual network adapter 214, etc. If the user selects the option 380 to highlight available physical network adapters 212, the model generator 154 may determine (e.g., based on the partition information 152 and the utilization information) which physical network adapters 212 are available to be assigned to the logical partition 202, according to one embodiment. For example, FIG. 3O shows a model 382 of the system 200. Referring to FIG. 3O, the model generator 154 may generate the model 382, which conveys to the user that the physical network adapter 384 is assigned to the logical partition 202. Further, the model 382 conveys that the physical network adapter 386 is assigned to another logical partition 202. Further still, the model 382 conveys that the physical network adapter 388 is not currently assigned to any logical partition 202. The model 382 may also include a legend 390 to convey respective statuses of each available physical network adapter 212, according to one embodiment.

The outage report 378 (for a logical partition 202) and the model 382 showing available network adapters 212 may include sufficient information to assist the user in selecting an available physical network adapter 212 to be assigned to the logical partition 202, according to one embodiment. For example, FIG. 3P illustrates a model 382 which shows a rear view of the system 200. Referring to FIG. 3P, the model generator 154 may receive (via options 392 accompanying the model 382) a request from the user to assign the physical network adapter 388 to the logical partition 202. Other options 392 are broadly contemplated and may be supported by embodiments of the invention. For example, the options 392 may include placing a purchase order for a new physical adapter to be installed into an available enclosure 304, 306 of the system 200, according to one embodiment. In one embodiment, the model generator 154 may also generate a model 156 that conveys to a user which enclosures may support a new physical adapter (e.g., have an usused, and correct type of, expansion slot for the new physical adapter), based on the partition information 152.

In one embodiment, the model generator 154 may also determine all single points of failure of the system 200, based on the partition information 152. A single point of failure refers to those hardware components 250 for which an outage may critically affect one or more logical partitions 202. The model generator 154 may then convey the determined single points of failure to the user.

In one embodiment, the model generator 154 may also display logs (e.g., application logs, system logs, security logs, error logs, etc.) of the system 200. For example, a user may wish to view only those log entries pertaining to a selected hardware component 250 of the system 200. In one embodiment, the model generator 154 displays only those log entries pertaining to the selected hardware component 250. A user may also wish to view only those log entries pertaining to only those hardware components 250 assigned to a selected logical partition 202. In one embodiment, the model generator 154 displays only those log entries pertaining to only those hardware components 250 assigned to the selected logical partition 202.

Figure 4:
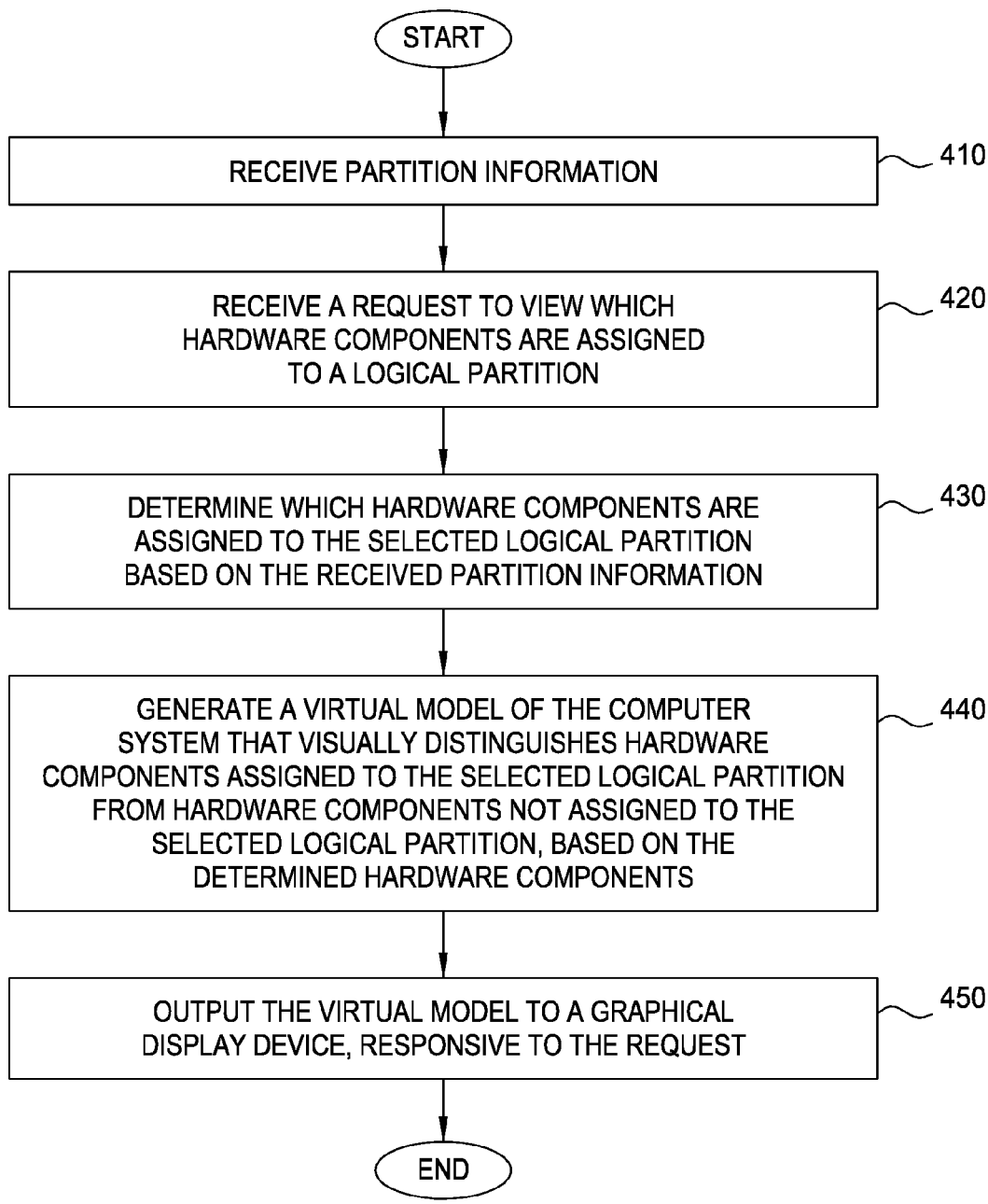
FIG. 4 is a flowchart depicting a method for conveying which hardware components of a logically partitioned computer system are assigned to a selected logical partition of the computer system, according to one embodiment of the invention.

FIG. 4 is a flowchart depicting a method 400 for conveying which hardware components of a logically partitioned computer system 200 are assigned to a selected logical partition 202 of the computer system, according to one embodiment of the invention. The method 400 may be performed by the model generator 154 of FIG. 1. As shown, the method 400 begins at step 410, where the model generator 154 receives partition information 152 for the system 200. For example, the partition information 152 may include one or more XML configuration files that describe the physical and logical characteristics of the system 200. At step 420, the model generator 154 receives, from a user, a request to view which hardware components 250 of the computer system 200 are assigned to a logical partition 202 of the computer system 200. For example a user may select, from the options 310 of FIG. 3D, an option to view partition resources.

At step 430, the model generator 154 determines which hardware components 250 of the computer system 200 are assigned to the selected logical partition 202, based on the received partition information 152, according to one embodiment. For example, the model generator 154 may determine the physical processors 104 and physical network adapters 212 that are assigned to an IBM® i partition 230. At step 440, the model generator 154 generates a virtual model 156 of the computer system 200 that visually distinguishes hardware components 250 assigned to the selected logical partition 202 from hardware components 250 not assigned to the selected logical partition 202, based on the determined hardware components. For example, the model 320 of FIG. 3E may be generated. At step 450, the model generator 154 outputs the virtual model 156 to a graphical display device, responsive to the request. After the step 450, the method 400 terminates.

Figure 5:
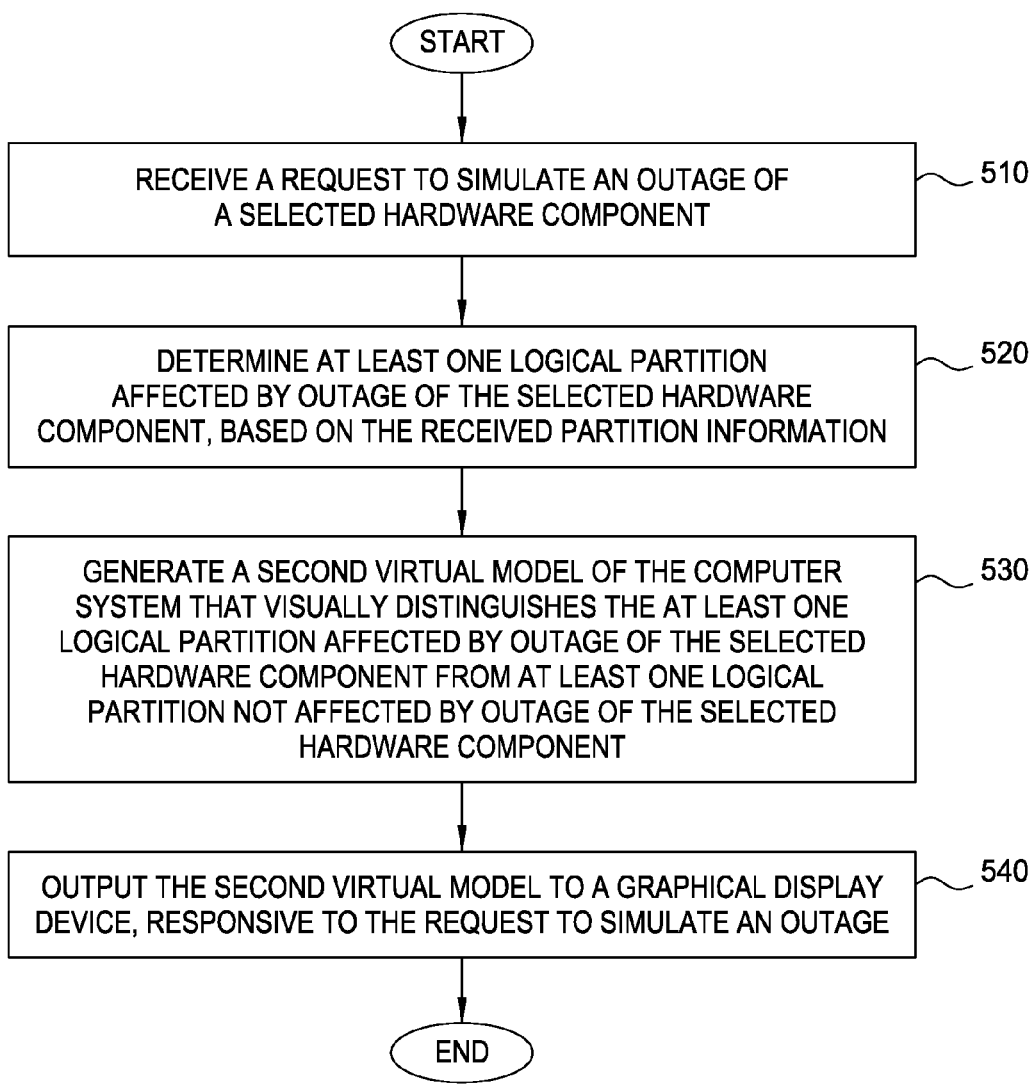
FIG. 5 is a flowchart depicting a method for simulating an outage of a selected hardware component of a computer system, according to one embodiment of the invention.

FIG. 5 is a flowchart depicting a method 500 for simulating an outage of a selected hardware component 250 of the computer system 200, according to one embodiment of the invention. The method 500 may be performed by the model generator 154 of FIG. 1. As shown, the method 500 begins at step 510, where the model generator 154 receives, from a user, a request to simulate an outage of a selected hardware component 250. For example, a user may select, from the options 374 of FIG. 3M, an option 376 to simulate an outage of a selected physical network adapter 362. At step 250, the model generator 154 determines at least one logical partition 202 affected by outage of the selected hardware component 250, based on the received partition information 152. For example, the model generator 154 may determine that the logical partition 202 for the VIO Server 210 is to be affected by the outage.

At step 530, the model generator 154 generates a new virtual model 156 of the computer system 200 that visually distinguishes the at least one logical partition 202 affected by outage of the selected hardware component 250 from at least one logical partition 202 not affected by outage of the selected hardware component 250, based on the determined at least one logical partition 250. For example, the new virtual model 156 may include a legend having colored icons representing logical partitions of the system 200. A red icon may represent a logical partition that is critically affected by the outage. A yellow icon may represent a logical partition that is affected (but not critically affected) by the outage. A green icon may represent a logical partition that is not affected by the outage. Other ways of visually distinguishing the at least one logical partition 202 affected by outage of the selected hardware component 250 from the at least one logical partition 202 not affected by outage of the selected hardware component 250 are broadly contemplated. For example, the icons may be of varying shapes, where the shapes correspond to predefined meanings.

At step 540, the model generator 154 outputs the new virtual model to a graphical display device, responsive to the request to simulate an outage. After the step 540, the method 500 terminates.

Figure 6:
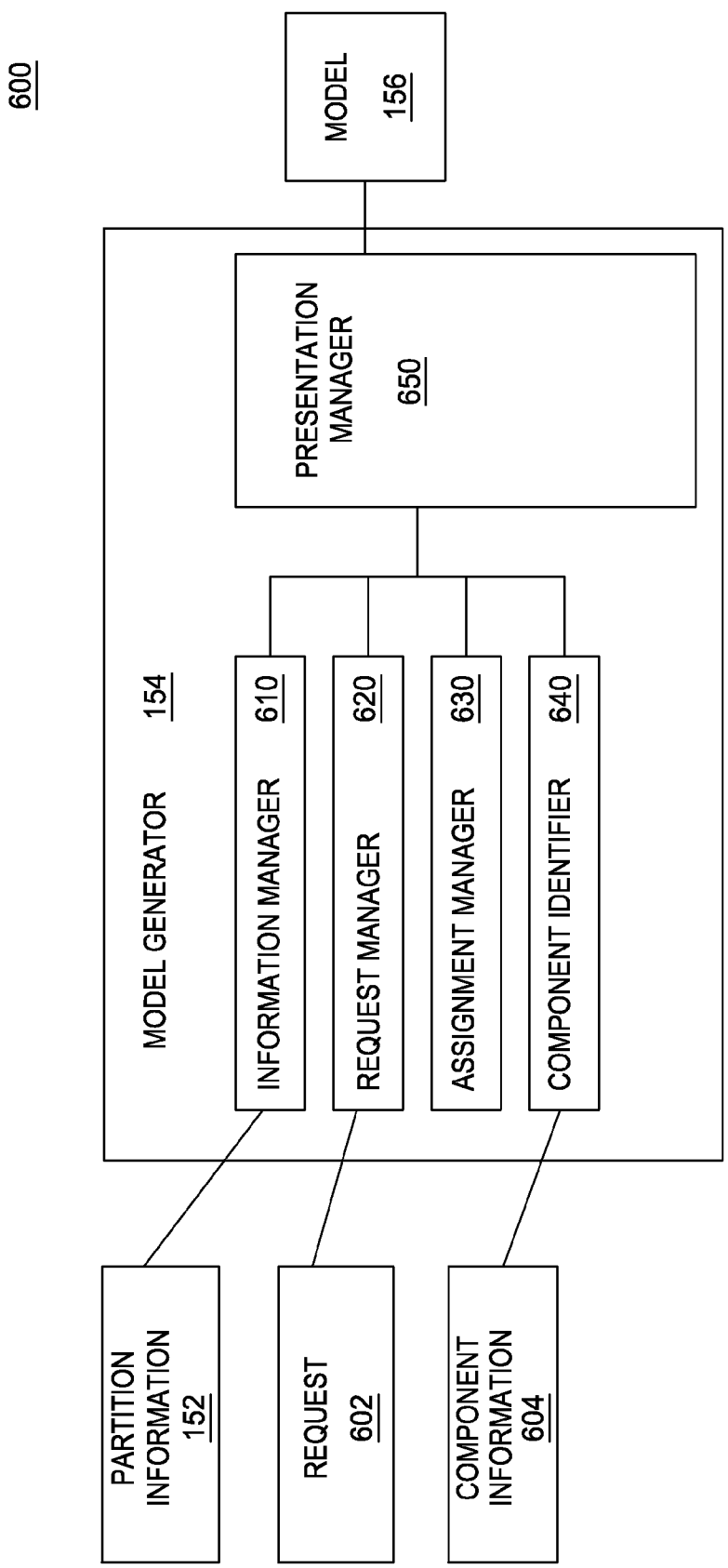
FIG. 6 is a block diagram illustrating components of a model generator, according to one embodiment of the invention.

FIG. 6 is a block diagram 600 illustrating components of the model generator 154 of FIG. 1, according to one embodiment of the invention. As shown, the model generator 154 includes an information manager 910, a request manager 902, an assignment manager 930, a component identifier 940, and a presentation manager 250.

In one embodiment, the information manager 610 receives the partition information 152 for the system 200. For example, the partition information 152 may include one or more XML configuration files that describe the physical and logical characteristics of the system 200. Further, the request manager 620 receives, from a user, a request 602 to view which hardware components 250 of the computer system 200 are assigned to a selected logical partition 202 of the computer system 200, according to one embodiment. The assignment manager 630 determines assignments of hardware components 250 to logical partitions 202, based on the received partition information 152, according to one embodiment. For example, referring to FIG. 3F, the assignment manager 630 may determine that physical network adapters 334 are assigned to a first logical partition 202; physical network adapters 336 are assigned to a second logical partition 202; physical network adapters 338 are assigned to a third logical partition 203; and physical network adapters 340 are not currently assigned to any logical partition 202.

In one embodiment, the component identifier 640 determines, for each hardware component 250 of the system 200, of a type of component to generate for the model 156, based on one or more location codes associated with the hardware component 250. For example, the component identifier 640 may use the location code to determine, based on component information 604 (e.g., a catalog of virtual models for each component type), that a CEC drawer having six physical processors 104 is to be generated. The presentation manager 650 generates a virtual model 156 of the system 200, based on the generated components and the received partition information 152, according to one embodiment. The presentation manager 650 may also generate other information, such as location codes 311 associated with each enclosure 304, 306, a legend 318, options 310, an outage report 374, etc. Further, the presentation manager 650 outputs the generated virtual model 156 (of the system 200) to a graphical display device, according to one embodiment. For example, the presentation manager 650 may output the generated virtual model 320 of FIG. 3E.

Of course, the embodiments described herein are intended to be illustrative and not limiting of the invention, and other embodiments are broadly contemplated. Those skilled in the art will recognize, for example, that embodiments of the invention may be adapted to support a model generator 154 executing on a computer other than the computer 102, other formats of the partition information 152, other ways of representing which hardware components are assigned to a logical partition of a computer system, and other system types (e.g., blade servers).

Advantageously, embodiments of the invention convey which hardware components of a logically partitioned computer system are assigned to a selected logical partition of the computer system. In one embodiment, a model generator may receive partition information for the computer system. Further, the model generator may receive a request from a user to view which hardware components of the computer system are assigned to a selected logical partition of the computer system. Based on the received partition information, the model generator may determine which hardware components are assigned to the selected logical partition. Based on the determined hardware components, the model generator may construct a virtual model of the computer system that visually distinguishes hardware components assigned to the selected logical partition from hardware components not assigned to the selected logical partition. The model generator may output the virtual model to a graphical display device, responsive to the request.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a request to simulate an outage of a hardware component, wherein the hardware component is selected from a plurality of hardware components of a computer system having a plurality of logical partitions;
retrieving partition information for the computer system, wherein the partition information describes the hardware components assigned to each logical partition of the computer system;
determining, based on the retrieved partition information, that a first logical partition of the plurality of logical partitions is one of: (i) affected and (ii) critically affected, by outage of the selected hardware component; wherein determining that the first logical partition is affected comprises determining that the first logical partition is assigned to at least one hardware component having an identical component type as the selected hardware component, and wherein determining that the first logical partition is critically affected comprises determining that the first logical partition is assigned to the selected hardware component and not assigned to any other hardware component having an identical component type as the selected hardware component;
generating, by operation of one or more computer processors and based on the first logical partition, a virtual model of the computer system that portrays at least one hardware component of the plurality of hardware components of the computer system and a corresponding location in which the at least one hardware component is physically located in the computer system, wherein the virtual model of the computer system visually distinguishes, from each other: (i) the first logical partition and (ii) a second logical partition of the plurality of logical partitions, that is unaffected by outage of the selected hardware component; and outputting the virtual model responsive to the request to simulate the outage of the selected hardware component.

2. The computer-implemented method of claim 1, wherein the first logical partition is selected from at least an IBM® Virtual Input/Output Server (VIOS) partition, an IBM® Advanced Interactive Executive (AIX®) partition, an IBM® i partition, and a Linux® partition.

3. The computer-implemented method of claim 1, wherein each hardware component is selected from at least a network interface device, a storage device, a memory, a processor, and a console.

4. The computer-implemented method of claim 1, wherein the virtual model of the computer system is a three-dimensional graphical representation of the computer system.

5. The computer-implemented method of claim 1, wherein the virtual model of the computer system further visually distinguishes the hardware components based on current level of utilization of the hardware components, wherein each logical partition virtualizes a respective subset of hardware components of the computer system, and wherein the subset of hardware components assigned to the first logical partition is different from the subset of hardware components assigned to the second logical partition.

6. The computer-implemented method of claim 1, wherein the operation further comprises:
    receiving a request to view available upgrade options for the computer system;
    identifying at least one empty enclosure of the computer system;
    generating, based on the retrieved partition information and the at least one empty enclosure, a list of available upgrade options for the computer system; and
    outputting the list of available upgrade options, responsive to the request to view available upgrade options for the computer system.

7. The computer-implemented method of claim 1, wherein the virtual model further depicts an assigned hardware component for each virtual adapter of the first logical partition.

8. The computer-implemented method of claim 1, wherein the second logical partition is determined to be unaffected by the outage, based on the second logical partition not being assigned to any hardware component having an identical component type as the selected hardware component.

9. A non-transitory computer readable medium containing a program which, when executed, performs an operation comprising:
    receiving a request to simulate an outage of a hardware component, wherein the hardware component is selected from a plurality of hardware components of a computer system having a plurality of logical partitions;
    retrieving partition information for the computer system, wherein the partition information describes the hardware components assigned to each logical partition of the computer system;
    determining, based on the retrieved partition information, that a first logical partition of the plurality of logical partitions is one of: (i) affected and (ii) critically affected, by outage of the selected hardware component; wherein determining that the first logical partition is affected comprises determining that the first logical partition is assigned to at least one hardware component having an identical component type as the selected hardware component, and wherein determining that the first logical partition is critically affected comprises determining that the first logical partition is assigned to the selected hardware component and not assigned to any other hardware component having an identical component type as the selected hardware component;
    generating, based on the first logical partition and by operation of one or more computer processors when executing the program, a virtual model of the computer system that portrays at least one hardware component of the plurality of hardware components of the computer system and a corresponding location in which the at least one hardware component is physically located in the computer system, wherein the virtual model of the computer system visually distinguishes, from each other: (i) the first logical partition and (ii) a second logical partition of the plurality of logical partitions, that is unaffected by outage of the selected hardware component; and
    outputting the virtual model responsive to the request to simulate the outage of the selected hardware component.

10. The non-transitory computer readable medium of claim 9, wherein the logical partition is selected from at least an IBM® Virtual Input/Output Server (VIOS) partition, an IBM® Advanced Interactive Executive (AIX®) partition, an IBM®i partition, and a Linux® partition.

11. The non-transitory computer readable medium of claim 9, wherein each hardware component is selected from at least a network interface device, a storage device, a memory, a processor, and a console.

12. The non-transitory computer readable medium of claim 9, wherein the virtual model of the computer system is a three-dimensional graphical representation of the computer system.

13. The non-transitory computer readable medium of claim 9, wherein the virtual model of the computer system further visually distinguishes the hardware components based on current level of utilization of the hardware components, wherein each logical partition virtualizes a respective subset of hardware components of the computer system, and wherein the subset of hardware components assigned to the first logical partition is different from the subset of hardware components assigned to the second logical partition.

14. The non-transitory computer readable medium of claim 9, wherein the operation further comprises:
    receiving, a request to view available upgrade options for the computer system;
    identifying at least one empty enclosure of the computer system; generating, based on the retrieved partition information and the at least one empty enclosure, a list of available upgrade options for the computer system; and
    outputting the list of available upgrade options responsive to the request to view available upgrade options for the computer system.

15. The non-transitory computer readable medium of claim 9, wherein the virtual model further depicts an assigned hardware component for each virtual adapter of the first logical partition.

16. The computer non-transitory readable medium of claim 9, wherein the second logical partition is determined to be unaffected by the outage, based on the second logical partition not being assigned to any hardware component having an identical component type as the selected hardware component.

17. A system, comprising:
a processor; and
a memory containing a program, which when executed by the processor is configured to perform an operation comprising:
  receiving a request to simulate an outage of a hardware component, wherein the hardware component is selected from a plurality of hardware components of a computer system having a plurality of logical partitions;
  retrieving partition information for the computer system, wherein the partition information describes the hardware components assigned to each logical partition of the computer system;
  determining, based on the retrieved partition information, that a first logical partition of the plurality of logical partitions is one of: (i) affected and (ii) critically affected, by outage of the selected hardware component; wherein determining that the first logical partition is affected comprises determining that the first logical partition is assigned to at least one hardware component having an identical component type as the selected hardware component, and wherein determining that the first logical partition is critically affected comprises determining that the first logical partition is assigned to the selected hardware component and not assigned to any other hardware component having an identical component type as the selected hardware component;
  generating, based on the first logical partition, a virtual model of the computer system that portrays at least one hardware component of the plurality of hardware components of the computer system and a corresponding location in which the at least one hardware component is physically located in the computer system, wherein the virtual model of the computer system visually distinguishes, from each other: (i) the first logical partition and (ii) a second logical partition of the plurality of logical partitions, that is unaffected by outage of the selected hardware component; and
  outputting the virtual model responsive to the request to simulate the outage of the selected hardware component.

18. The system of claim 17, wherein the logical partition is selected from at least an IBM® Virtual Input/Output Server (VIOS) partition, an IBM® Advanced Interactive Executive (AIX®) partition, an IBM® i partition, and a Linux® partition.

19. The system of claim 17, wherein each hardware component is selected from at least a network interface device, a storage device, a memory, a processor, and a console.

20. The system of claim 17, wherein the virtual model of the computer system is a three-dimensional graphical representation of the computer system.

21. The system of claim 17, wherein the virtual model of the computer system further visually distinguishes the hardware components based on current level of utilization of the hardware components, wherein each logical partition virtualizes a respective subset of hardware components of the computer system, and wherein the subset of hardware components assigned to the first logical partition is different from the subset of hardware components assigned to the second logical partition.

22. The system of claim 17, wherein the operation further comprises:
  receiving a request to view available upgrade options for the computer system;
  identifying at least one empty enclosure of the computer system;
  generating, based on the retrieved partition information and the at least one empty enclosure, a list of available upgrade options for the computer system; and
  outputting the list of available upgrade options, responsive to the request to view available upgrade options for the computer system.

23. The system of claim 17, wherein the virtual model further depicts an assigned hardware component for each virtual adapter of the first logical partition.

24. The system of claim 17, wherein the second logical partition is determined to be unaffected by the outage, based on the second logical partition not being assigned to any hardware component having an identical component type as the selected hardware component.

* * * * *